(12) United States Patent
Kim et al.

(10) Patent No.: US 11,936,732 B2
(45) Date of Patent: Mar. 19, 2024

(54) INTERNET OF THINGS BASED CLOTHING PROCESSING APPARATUS, AND CONTROL METHOD THEREOF

(71) Applicant: Samsung Electronics Co., Ltd., Suwon-si (KR)

(72) Inventors: Jooyoo Kim, Suwon-si (KR); Jeongnam Kim, Suwon-si (KR); Jeongchoul Park, Suwon-si (KR); Jongwoon Park, Suwon-si (KR); Heekyung Yang, Suwon-si (KR); Jisoo Yeh, Suwon-si (KR); Miyoung Yoo, Suwon-si (KR); Jieun Lee, Suwon-si (KR); Jihyeon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 17/517,235

(22) Filed: Nov. 2, 2021

(65) Prior Publication Data
US 2022/0060544 A1 Feb. 24, 2022

Related U.S. Application Data

(63) Continuation of application No. PCT/KR2021/009756, filed on Jul. 28, 2021.

(30) Foreign Application Priority Data

Jul. 30, 2020 (KR) .......................... 10-2020-0095437

(51) Int. Cl.
*H04L 67/12* (2022.01)
*D06F 34/04* (2020.01)
(Continued)

(52) U.S. Cl.
CPC .............. *H04L 67/12* (2013.01); *D06F 34/04* (2020.02); *D06F 34/06* (2020.02); *G05B 13/027* (2013.01);
(Continued)

(58) Field of Classification Search
CPC .......... D06F 58/46; D06F 34/05; D06F 33/44; D06F 2105/56; D06F 2103/00; D06F 2105/52
See application file for complete search history.

(56) References Cited

U.S. PATENT DOCUMENTS

| 9,367,058 B2 | 6/2016 | Kang et al. |
| 11,078,613 B2 | 8/2021 | Bae et al. |

(Continued)

FOREIGN PATENT DOCUMENTS

| CN | 102383286 A | 3/2012 |
| CN | 102383286 B | 1/2016 |

(Continued)

OTHER PUBLICATIONS

International Search Report dated Nov. 24, 2021, issued in International Patent Application No. PCT/ KR2021/009756.
(Continued)

*Primary Examiner* — Mirza F Alam
(74) *Attorney, Agent, or Firm* — Jefferson IP Law, LLP

(57) ABSTRACT

A clothing processing apparatus included in an Internet of Things (IoT) system is provided. The clothing processing apparatus includes a communication interface and a processor configured to perform a process including at least one clothing processing operation.

14 Claims, 21 Drawing Sheets

(51) Int. Cl.
*D06F 34/06* (2020.01)
*G05B 13/02* (2006.01)
*G16Y 40/35* (2020.01)
*G16Y 40/60* (2020.01)
*D06F 105/56* (2020.01)
*G16Y 10/80* (2020.01)

(52) U.S. Cl.
CPC .............. *G16Y 40/35* (2020.01); *G16Y 40/60* (2020.01); *D06F 2105/56* (2020.02); *G16Y 10/80* (2020.01)

(56) References Cited

U.S. PATENT DOCUMENTS

| | | | |
|---|---|---|---|
| 11,091,865 | B2 | 8/2021 | Kamiyama et al. |
| 11,150,676 | B2 | 10/2021 | Lee |
| 11,245,544 | B2 | 2/2022 | Lee |
| 2016/0195859 | A1* | 7/2016 | Britt .................. H04W 4/80 700/275 |
| 2017/0005820 | A1* | 1/2017 | Zimmerman ........... H04L 67/10 |
| 2019/0032264 | A1 | 1/2019 | Bae et al. |
| 2019/0071810 | A1* | 3/2019 | Bae ..................... D06F 33/36 |
| 2019/0301068 | A1 | 10/2019 | Kamiyama et al. |
| 2020/0004278 | A1* | 1/2020 | Lee .................... G05D 23/1904 |
| 2020/0024792 | A1* | 1/2020 | Lee .................... D06F 33/44 |
| 2021/0062385 | A1 | 3/2021 | Kim et al. |
| 2022/0325460 | A1 | 10/2022 | Kim et al. |

FOREIGN PATENT DOCUMENTS

| | | |
|---|---|---|
| JP | 2003-015911 A | 1/2003 |
| JP | 2006-228097 A | 8/2006 |
| JP | 2019-130198 A | 8/2019 |
| JP | 2019-180549 A | 10/2019 |
| KR | 10-0747816 B1 | 8/2007 |
| KR | 10-1617995 B1 | 5/2016 |
| KR | 10-2017-0089605 A | 8/2017 |
| KR | 10-2017-0089607 A | 8/2017 |
| KR | 10-2019-0087348 A | 7/2019 |
| KR | 10-2019-0107610 A | 9/2019 |
| KR | 10-2021-0087728 A | 7/2021 |
| WO | 2012/144776 A2 | 10/2012 |
| WO | 2017/131484 A1 | 8/2017 |
| WO | 2019/045373 A1 | 3/2019 |

OTHER PUBLICATIONS

Extended European Search Report dated Oct. 2, 2023, issued in European Patent Application No. 21849583.6.

* cited by examiner

INTERNET OF THINGS BASED CLOTHING PROCESSING APPARATUS, AND CONTROL METHOD THEREOF

CROSS-REFERENCE TO RELATED APPLICATION(S)

This application is a continuation application, claiming priority under § 365(c), of an International application No. PCT/KR2021/009756, filed on Jul. 28, 2021, which is based on and claims the benefit of a Korean patent application number 10-2020-0095437, filed on Jul. 30, 2020, in the Korean Intellectual Property Office, the disclosure of which in incorporated by reference herein in its entirety.

BACKGROUND

1. Field

The disclosure relates to a clothing processing apparatus which is an Internet of Things (IoT) apparatus included in an IoT system. More particularly, the disclosure relates to a clothing processing apparatus that controls a clothing processing process according to a context of an IoT system.

2. Description of the Related Art

When a user leaves clothing in a washing machine or a drying machine in a home without taking out the clothing from the washing machine or the drying machine after a washing process or a drying process in the washing machine or the drying machine ends, the clothing in the washing machine or the drying machine may be damaged.

To solve such a problem, a clothing processing apparatus such as a washing machine or a drying machine according to the related art has provided a notification regarding the end of the washing process or the drying process when the washing process or the drying process ends. However, a situation of the user cannot but be different per point in time when the notification is provided, and thus, in many cases, the user could not take out the clothing from the washing machine or the drying machine even though the notification was provided.

The above information is presented as background information only to assist with an understanding of the disclosure. No determination has been made, and no assertion is made, as to whether any of the above might be applicable as prior art with regard to the disclosure.

SUMMARY

Aspect of the disclosure are to address at least the above-mentioned problems and/or disadvantages and to provide at least the advantages described below. Accordingly, the disclosure is to provide a clothing processing apparatus capable of flexibly changing a remaining process of a clothing processing process that is being performed, based on contexts of one or more electronic apparatuses in an Internet of Things (IoT) system, and a control method thereof.

Another aspect of the disclosure is to provide a server apparatus that controls a clothing processing apparatus according to a user's situation, based on contexts of one or more electronic apparatuses.

Additional aspects will be set forth in part in the description which follows and, in part, will be apparent from the description, or may be learned by practice of the presented embodiments.

In accordance with an aspect of the disclosure, a clothing processing apparatus included in an Internet of Things (IoT) system is provided. The clothing processing apparatus includes a communication interface and a processor configured to perform a process including at least one clothing processing operation. The processor is configured to receive information on a context of an electronic apparatus included in the IoT system from the electronic apparatus through the communication interface during a period in which the process is being performed, identify whether or not a relationship between a remaining time until an end of the process that is being performed and the context of the electronic apparatus satisfies a predetermined condition, based on the received information, and change and perform a remaining process of the process that is being performed so that the remaining time is changed when it is identified that the predetermined condition is satisfied.

In this case, the information on the context of the electronic apparatus may include information on a remaining time until an end of a content that is being provided by the electronic apparatus, and the processor may be configured to identify that the predetermined condition is satisfied when it is identified that the remaining time of the content that is being provided by the electronic apparatus is longer than the remaining time of the process by a threshold time or more, based on the received information.

In addition, the information on the context of the electronic apparatus may include information on a position of the electronic apparatus, and the processor may be configured to identify that the predetermined condition is satisfied when it is identified that the position of the electronic apparatus becomes distant from a place where the clothing processing apparatus is positioned, by a threshold distance or more during a period in which the process is performed, based on the received information.

In addition, the information on the context of the electronic apparatus may include information on a remaining time until an end of a process that is being performed by the electronic apparatus, and the processor may be configured to identify that the predetermined condition is satisfied when it is identified that a first remaining time of the process that is being performed by the electronic apparatus and a second remaining time of the process that is being performed by the clothing processing apparatus are different from each other and a difference between the first and second remaining times is less than a threshold time, based on the received information.

In addition, the information on the context of the electronic apparatus may include information on a remaining time until an end of a process that is being performed by the electronic apparatus, and the processor may be configured to identify that the predetermined condition is satisfied when it is identified that a ratio of a first remaining time of a first process that is being performed by the electronic apparatus to a total time of the first process and a ratio of a second remaining time of a second process that is being performed by the clothing processing apparatus to a total time of the second process is a threshold ratio or more and the first remaining time and the second remaining time are different from each other, based on the received information.

The processor may be configured to adjust a performance time of at least one clothing processing operation included in the remaining process of the process that is being performed, when it is identified that the predetermined condition is satisfied.

Alternatively, the processor may be configured to add at least one clothing processing operation to the remaining process of the process that is being performed, when it is identified that the predetermined condition is satisfied.

The processor may be configured to add at least one clothing processing operation included in the process to the remaining process of the process that is being performed or add a new clothing processing operation that was not included in the process to the remaining process of the process that is being performed.

In accordance with one embodiment of the disclosure, a control method of a clothing processing apparatus included in an IoT system is provided. The control method includes performing a process including at least one clothing processing operation, receiving information on a context of an electronic apparatus included in the IoT system from the electronic apparatus during a period in which the process is being performed, identifying whether or not a relationship between a remaining time until an end of the process that is being performed and the context of the electronic apparatus satisfies a predetermined condition, based on the received information, and changing a remaining process of the process that is being performed so that the remaining time is changed when it is identified that the predetermined condition is satisfied.

In this case, the information on the context of the electronic apparatus may include information on a remaining time until an end of a content that is being provided by the electronic apparatus, and in the identifying, it may be identified that the predetermined condition is satisfied when it is identified that the remaining time of the content that is being provided by the electronic apparatus is longer than the remaining time of the process by a threshold time or more, based on the received information.

In addition, the information on the context of the electronic apparatus may include information on a position of the electronic apparatus, and in the identifying, it may be identified that the predetermined condition is satisfied when it is identified that the position of the electronic apparatus becomes distant from a place where the clothing processing apparatus is positioned, by a threshold distance or more during a period in which the process is performed, based on the received information.

In addition, the information on the context of the electronic apparatus may include information on a remaining time until an end of a process that is being performed by the electronic apparatus, and in the identifying, it may be identified that the predetermined condition is satisfied when it is identified that a first remaining time of the process that is being performed by the electronic apparatus and a second remaining time of the process that is being performed by the clothing processing apparatus are different from each other and a difference between the first and second remaining times is less than a threshold time, based on the received information.

In addition, the information on the context of the electronic apparatus may include information on a remaining time until an end of a process that is being performed by the electronic apparatus, and in the identifying, it may be identified that the predetermined condition is satisfied when it is identified that a ratio of a first remaining time of a first process that is being performed by the electronic apparatus to a total time of the first process and a ratio of a second remaining time of a second process that is being performed by the clothing processing apparatus to a total time of the second process is a threshold ratio or more and the first remaining time and the second remaining time are different from each other, based on the received information.

In the changing, a performance time of at least one clothing processing operation included in the remaining process of the process that is being performed may be adjusted, when it is identified that the predetermined condition is satisfied.

In addition, in the changing, at least one clothing processing operation may be added to the remaining process of the process that is being performed, when it is identified that the predetermined condition is satisfied.

In the changing, at least one clothing processing operation included in the process may be added to the remaining process of the process that is being performed or a new clothing processing operation that was not included in the process may be added to the remaining process of the process that is being performed.

In accordance with another aspect of the disclosure, a server apparatus controlling an IoT system is provided. The server apparatus includes a communication interface connected to a clothing processing apparatus and an electronic apparatus that are included in the IoT system, and a processor connected to the communication interface. The processor is configured to receive information on a process performed by the clothing processing apparatus from the clothing processing apparatus through the communication interface, receive information on a context of the electronic apparatus through the communication interface, identify whether or not a relationship between a remaining time until an end of the process that is being performed and the context of the electronic apparatus satisfies a predetermined condition during a period in which the process is being performed by the clothing processing apparatus, and control the clothing processing apparatus to change a remaining process of the process that is being performed through the communication interface when it is identified that the predetermined condition is satisfied.

The processor may be configured to transmit information on the process whose remaining process is changed to a user terminal apparatus through the communication interface.

The clothing processing apparatus according to the disclosure may end a clothing processing process that is being performed, at a point in time appropriate to a user's situation based on information on a context of an external electronic apparatus, even though there is no user input for changing an end time of the clothing processing process.

Therefore, the clothing processing apparatus according to the disclosure may prevent a situation in which clothing is left for a long time after the clothing processing process ends.

The server apparatus according to the disclosure may automatically control the clothing processing apparatus performing the clothing processing process so that the clothing processing apparatus may end the clothing processing process to be appropriate for the user's situation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
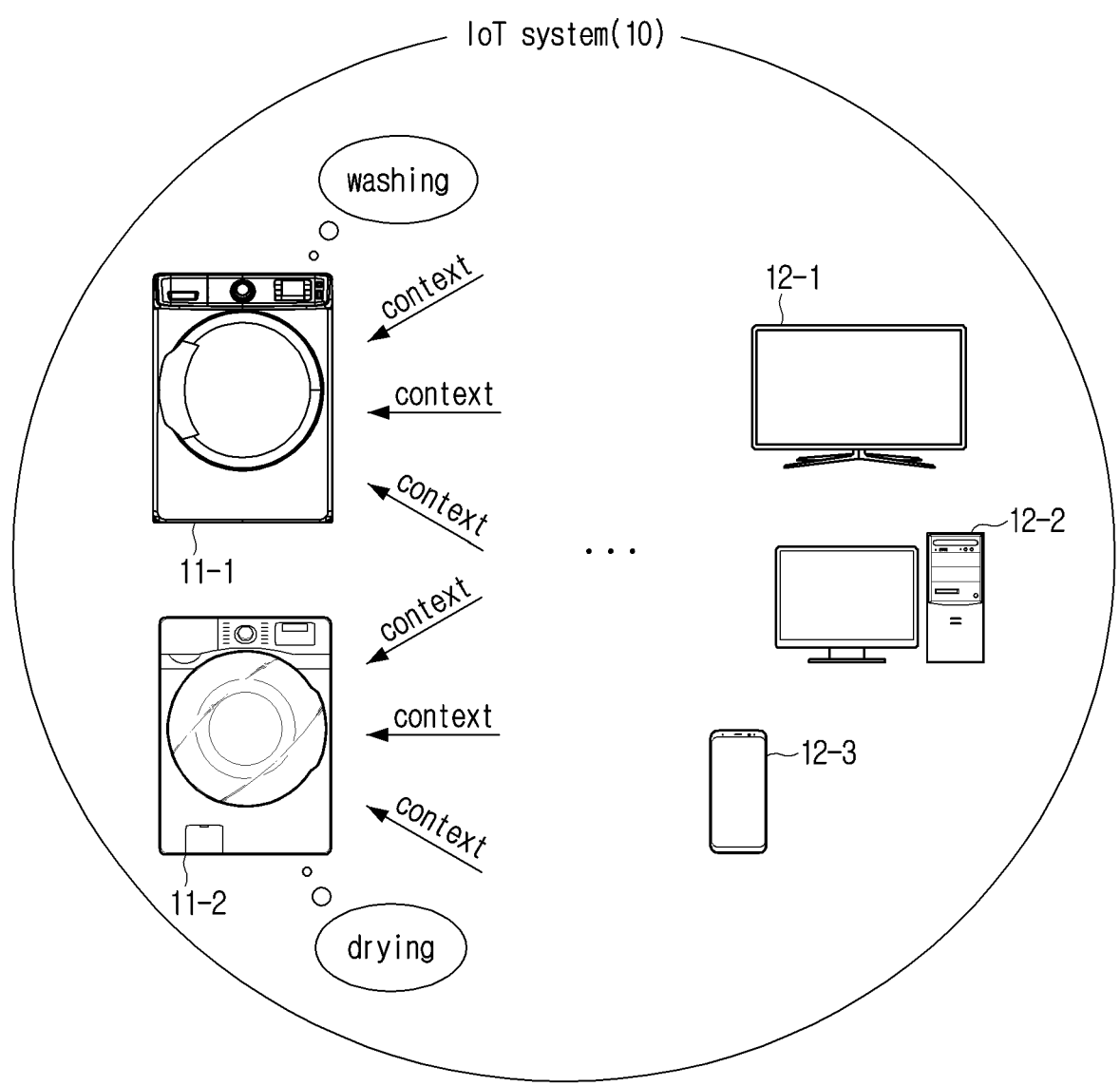
FIG. 1 is a view for schematically describing an example in which a clothing processing apparatus operates in an Internet of Things (IoT) system according to an embodiment the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

In addition, throughout the accompanying drawings of the specification, the same reference numerals denote parts or components performing substantially the same functions. For convenience of explanation and understanding, different embodiments will be described using the same reference numerals. That is, even though all the components having the same reference numerals are illustrated in a plurality of drawings, the plurality of drawings do not mean one embodiment.

In addition, in the specification and the claims, terms including ordinal numbers such as "first", "second" and the like may be used to distinguish between components. These ordinal numbers are used to distinguish the same or similar components from each other, and the meaning of the terms should not be restrictively construed by the use of these ordinal numbers. As an example, components combined with these ordinal numbers should not be limited in order of use or arrangement by the ordinal numbers. If necessary, the respectively ordinal numbers may be interchangeably used.

In the specification, singular forms include plural forms unless the context clearly indicates otherwise. It should be understood that terms "include" or "formed of" used in the specification specify the presence of features, numerals, operations, components, parts, or combinations thereof mentioned in the specification, but do not preclude the presence or addition of one or more other features, numerals, operations, components, parts, or combinations thereof.

In embodiments of the disclosure, a term such as a "module", a "unit", "part", or the like, is a term for referring to a component performing at least one function or operation, and such a component may be implemented as hardware or software or be implemented as a combination of hardware and software. In addition, a plurality of "modules", "units", "parts", or the like, are integrated into at least one module or chip, except that they need to be implemented as individual specific hardware, such that they may be implemented as at least one processor.

In addition, in an embodiment of the disclosure, a case where any portion is referred to as being "connected to" another portion not only includes a case where any one portion and another portion are "directly connected to" each other, but also includes a case where any one portion and another portion are "indirectly connected to" each other through the other medium. In addition, unless explicitly described otherwise, "including" any components will be understood to imply the inclusion of other components rather than the exclusion of any other components.

FIG. 1 is a view for schematically describing an example in which a clothing processing apparatus operates in an Internet of Things (IoT) system according to an embodiment of the disclosure. FIG. 1 illustrates an IoT system for controlling home appliances and terminal apparatuses in a house.

Referring to FIG. 1, an IoT system 10 may include clothing processing apparatuses 11-1 and 11-2 each corresponding to a washing machine and a drying machine, and other electronic apparatuses 12-1, 12-2, and 12-3. The electronic apparatuses 12-1, 12-2, and 12-3 may include various home appliances or terminal apparatuses in addition to a television (TV), a desktop personal computer (PC), and a smartphone that are illustrated in FIG. 1.

The abovementioned clothing processing apparatuses 11-1 and 11-2 and electronic apparatuses 12-1, 12-2, and 12-3 in the IoT system 10 may communicate with each other. In this case, one or more server apparatuses may be used.

Each of the clothing processing apparatuses 11-1 and 11-2 may control processes (for example, a washing process, a drying process, and the like) for clothing processing based on information on contexts received from the electronic apparatuses 12-1, 12-2, and 12-3. The information on the context may refer to information on a state or a situation of each apparatus, and more specific embodiments related to the information on the context will be described later with reference to each of the drawings.

As an example, the washing machine 11-1 may change a remaining process of a washing process based on information on a context received from at least one electronic apparatus while performing the washing process including operations such as washing, rinsing, dewatering, and drying.

As an example, the drying machine 11-2 may change a remaining process of a drying process based on information on a context received from at least one electronic apparatus while performing the drying process including operations such as drying and wrinkle prevention.

A clothing processing process that is being performed by at least one clothing processing apparatus may also be changed based on information on a context transmitted and received between the clothing processing apparatuses 11-1 and 11-2.

For example, the washing machine 11-1 may change the remaining process of the washing process based on information on a context received from the drying machine 11-2. In addition, the drying machine 11-2 may also change the remaining process of the washing process based on information on a context received from the washing machine 11-1.

As described above, the clothing processing apparatuses 11-1 and 11-2 according to the disclosure may change and control the clothing processing process through information on the context of another apparatus included in the IoT system 10, and may resultantly prevent a situation such as a situation in which the clothing processing process ends even when a user may not take out clothing from the clothing processing apparatuses 11-1 and 11-2 or a situation in which the clothing processing process ends at a point in time that is not wanted by the user.

Figure 2:
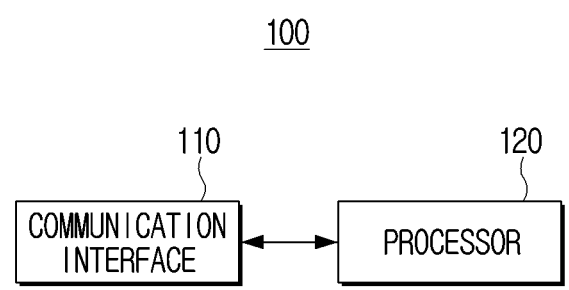
FIG. 2 is a block diagram for describing components of a clothing processing apparatus according to an embodiment of the disclosure.

FIG. 2 is a block diagram for describing components of a clothing processing apparatus according to an embodiment of the disclosure. Referring to FIG. 2, the clothing processing apparatus 100 may include a communication interface 110 and a processor 120.

The clothing processing apparatus 100 may correspond to a washing machine, a drying machine, or other apparatus for removing foreign materials from clothing or preserving a state of clothing. A washing machine 100-1 and a drying machine 100-2 according to embodiments to be described hereinafter through a plurality of drawings may be specific examples of the clothing processing apparatus 100, respectively.

The communication interface 110 is a component for performing communication with at least one external apparatus. To this end, the communication interface 110 may include a circuit.

The clothing processing apparatus 100 may be included in at least one IoT system. In this case, the clothing processing apparatus 100 may perform communication with various external apparatuses included in the IoT system through the communication interface 110.

The clothing processing apparatus 100 may perform communication with at least one electronic apparatus through the communication interface 110. The electronic apparatus may correspond to various home appliances or terminal apparatuses such as a TV, a smartphone, a desktop PC, a laptop PC, a tablet PC, an electric light, a speaker, and an air purifier. In addition, the electronic apparatus may correspond to a clothing processing apparatus different from the clothing processing apparatus 100.

The communication interface 110 may transmit and receive various information to and from one or more external electronic apparatuses through a communication protocol such as transmission control protocol/Internet protocol (TCP/IP), user datagram protocol (UDP), hyper text transfer protocol (HTTP), secure hyper text transfer protocol (HTTPS), file transfer protocol (FTP), secure file transfer protocol (SFTP), and message queuing telemetry transport (MQTT).

To this end, the communication interface 110 may be connected to an external electronic apparatus based on a network implemented through wired communication and/or wireless communication. In this case, the communication interface 110 may be directly connected to the external electronic apparatus, but may also be connected to the external electronic apparatus through one or more external servers (for example, Internet service providers (ISPs)) and/or a relay apparatus providing a network. In addition, the communication interface 110 may be connected to at least one server through an application to be connected to the external electronic apparatus connected to the server through the application.

The network may be a personal area network (PAN), a local area network (LAN), a wide area network (WAN), or the like, depending on an area or a size thereof, and may be an Intranet, an Extranet, the Internet, or the like, depending on openness thereof.

The wireless communication may include at least one of communication manners such as long-term evolution (LTE), LTE Advanced (LTE-A), 5th generation (5G) mobile communication, code division multiple access (CDMA), wideband CDMA (WCDMA), universal mobile telecommunications system (UMTS), wireless broadband (WiBro), global system for mobile communications (GSM), time division multiple access (TDMA), wireless fidelity (Wi-Fi), Wi-Fi Direct, Bluetooth, near field communication (NFC), and Zigbee. The wired communication may include at least one of communication manners such as Ethernet, an optical network, a universal serial bus (USB), and ThunderBolt. The communication interface 110 may include a network interface or a network chip according to the wired and wireless communication manners described above. The communication manner is not limited to the examples described above, and may include a communication manner newly emerging according to the development of technology.

The processor 120 is a component for generally controlling each component included in the clothing processing apparatus 100, and may be implemented as a general-purpose processor such as a central processing unit (CPU) or an application processor (AP), a graphics-dedicated processor such as a graphics processing unit (GPU) or a vision processing unit (VPU), or an artificial intelligence-dedicated processor such as a neural processing unit (NPU). In addition, the processor 120 may include a volatile memory such as a static random access memory (SRAM).

The processor 120 may perform a process including at least one clothing processing operation. To this end, the process may be stored in a memory of the clothing processing apparatus 100 in a form of at least one instruction or program.

As an example, when the clothing processing apparatus 100 is the washing machine, the processor 120 may perform a washing process including at least one of operations such as washing, rinsing, and dewatering.

As an example, when the clothing processing apparatus 100 is the drying machine, the processor 120 may perform a washing process including at least one of operations such as drying and wrinkle prevention.

The processor 120 may receive information on a context of an electronic apparatus from at least one electronic apparatus through the communication interface 110. In this case, the clothing processing apparatus 100 and the electronic apparatus may be included in the same IoT system.

The context may be broadly interpreted as a term including a situation or a state of an electronic apparatus. The information on the context may include, for example, information on a content that is being reproduced by the electronic apparatus, information on a position of the electronic apparatus, information on at least one process that is being performed by the electronic apparatus, information on at least one application that is being performed by the electronic apparatus, and the like, but is not limited thereto.

The processor 120 may receive information on a context from the electronic apparatus through at least one server apparatus.

The processor 120 according to an embodiment of the disclosure may receive the information on the context from the electronic apparatus while performing a process including at least one clothing processing operation.

The processor 120 may identify whether a relationship between a remaining time until an end of the process that is being performed and the context of the electronic apparatus satisfies at least one predetermined condition, based on the received information on the context.

In addition, when it is identified that at least one predetermined condition is satisfied, the processor 120 may change and perform the remaining process of the process that is being performed so that the remaining time of the process that is being performed is changed.

At least one predetermined condition may include various conditions. In addition, the processor 120 may change and perform the remaining process of the process so that the remaining time of the process is changed according to the satisfied predetermined condition. That is, a manner in which the remaining time of the process is changed (such as, increase/decrease, an increase degree, or a decrease degree) may be changed depending on what the predetermined condition is.

Hereinafter, a predetermined condition according to various embodiments of the disclosure and a manner of changing a remaining time according to the predetermined condition will be described with reference to FIGS. 3A to 3D, 4, 5A and 5B, and the like.

FIGS. 3A to 3D are views for describing various examples in which a clothing processing apparatus identifies whether a predetermined condition is satisfied, based on information on a context of an electronic apparatus that reproduces a content according to various embodiment of the disclosure.

Referring to FIGS. 3A to 3D, the received information on the context of the electronic apparatus may be information on a remaining time until an end of a content that is being provided by the electronic apparatus. In this case, the processor 120 may identify whether a predetermined condition is satisfied, based on a relationship between the remaining time of the process that is being performed and the remaining time of the content that is being provided by the electronic apparatus.

As a specific example, when it is identified that the remaining time of the content that is being provided by the electronic apparatus is longer than the remaining time of the process that is being performed, by a first threshold time or more, the processor 120 may identify that the predetermined condition is satisfied.

The first threshold time may be a time set based on a time that it takes for the clothing left in the clothing processing apparatus after an end of the washing process or the drying process to be damaged.

Figure 3A:
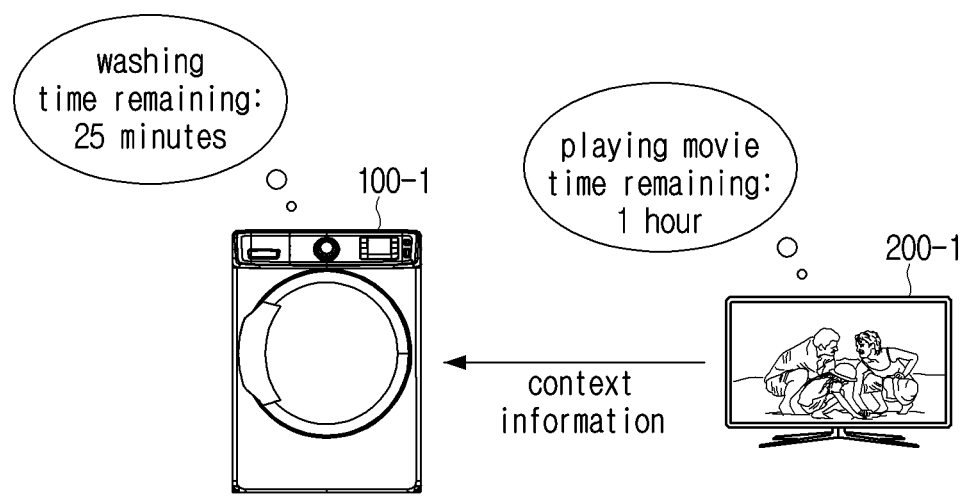
FIGS. 3A, 3B, 3C, and 3D are views for describing various examples in which a clothing processing apparatus identifies whether a predetermined condition is satisfied, based on information on a context of an electronic apparatus that reproduces a content according to various embodiments of the disclosure.

In this regard, FIG. 3A assumes a state in which a clothing processing apparatus 100-1, which is a washing machine, is performing a washing process, and an electronic apparatus 200-1, which is a TV, is playing a movie. Referring to FIG. 3A, a remaining time of the washing process is 25 minutes, and a remaining time of the movie that is being played by the electronic apparatus 200-1 is 1 hour.

When the first threshold time is set to 20 minutes for the clothing processing apparatus 100-1, which is the washing machine, the remaining time of the movie is longer than the remaining time of the washing process by 20 minutes or more (35 minutes) in FIG. 3A, and thus, the clothing processing apparatus 100-1 may identify that the predetermined condition is satisfied.

In this case, the clothing processing apparatus 100-1 may change and perform the remaining process of the washing process. As an example, the clothing processing apparatus 100-1 may change the remaining process so that the remaining time of the washing process increases. As a result, the washing process may end later than the movie that is being played, and the user may not be disturbed while watching the movie. In addition, the user may unhurriedly take out clothing from the clothing processing apparatus 100-1 after the movie ends.

Figure 3B:
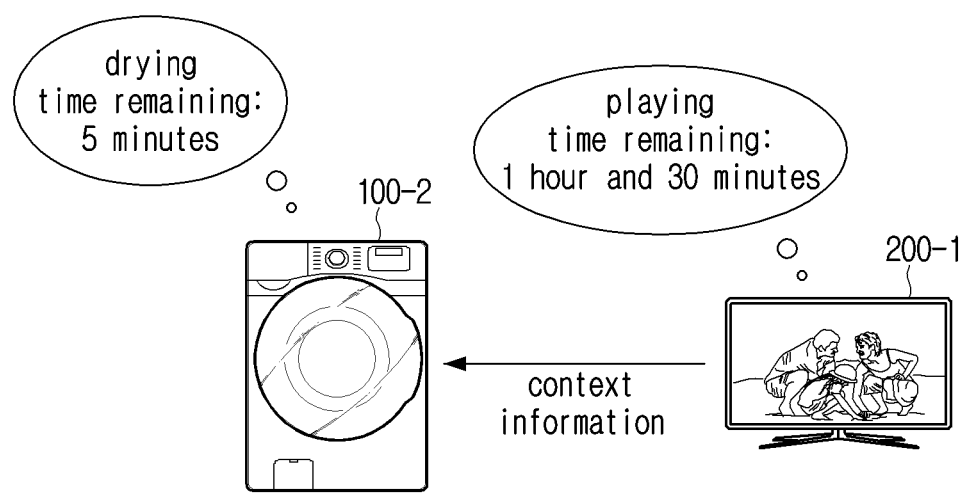

In this regard, FIG. 3B assumes a state in which a clothing processing apparatus 100-2, which is a drying machine, is performing a drying process, and an electronic apparatus 200-1, which is a TV, is playing a movie. Referring to FIG. 3B, a remaining time of the washing process is 5 minutes, while a remaining time of the movie is 1 hour and 30 minutes.

When the first threshold time is set to 40 minutes for the clothing processing apparatus 100-2, which is the drying machine, the remaining time of the movie is longer than the remaining time of the drying process by 40 minutes or more (1 hour and 25 minutes) in FIG. 3B, and thus, the clothing processing apparatus 100-2 may identify that the predetermined condition is satisfied. In this case, the clothing processing apparatus 100-2 may change and perform the remaining process of the drying process.

As another example, when the remaining time of the process that is being performed is longer than the remaining time of the content that is being provided by the electronic apparatus and a difference between the remaining times is shorter than a second threshold time, the processor 120 may also identify that the predetermined condition is satisfied.

The second threshold time may be set based on a time in which an effect of washing or drying is maintained at a predetermined numerical value or more (the predetermined numerical value may be a numerical value for at least one of various factors that may be used to evaluate a quality of the washing process/drying process of the washing machine/ drying machine, may be pre-defined by an experiment or common technical knowledge, and may be, for example, an amount of residual foreign materials on clothing, a degree of deterioration of the clothing, a degree of wrinkles in the clothing, an amount of residual detergent on the clothing, a degree of dewatering of the clothing, or the like, after the washing process/drying process) even though processes of an original washing process or drying process are reduced by a specific time.

Figure 3C:
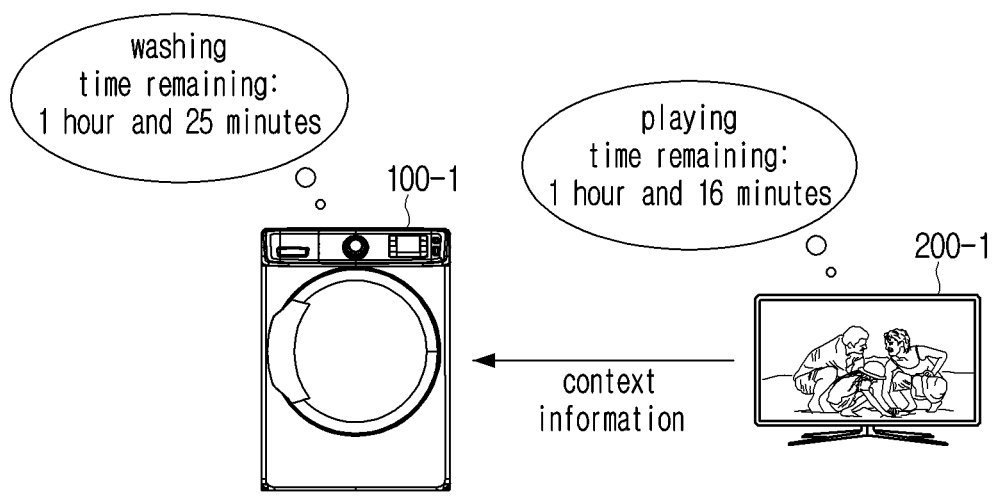

In this regard, FIG. 3C assumes a state in which a clothing processing apparatus 100-1, which is a washing machine, is performing a washing process, and an electronic apparatus 200-1, which is a TV, is playing a movie. Referring to FIG. 3C, a remaining time of the washing process is 1 hour and 25 minutes, and a remaining time of the movie that is being played by the electronic apparatus 200-1 is 1 hour and 16 minutes.

When the second threshold time is set to 20 minutes, the remaining time of the washing process that is being performed is longer than the remaining time of the movie by 9 minutes (less than 20 minutes), and thus, the clothing processing apparatus 100-1 may identify that the predetermined condition is satisfied.

In this case, the clothing processing apparatus 100-1 may change the remaining process of the washing process. As an example, the clothing processing apparatus 100-1 may change the remaining process so that the remaining time of the washing process decreases in a range in which the washing process does not end before the movie ends. In this case, the user may take out the clothing from the clothing processing apparatus 100-1 immediately after the movie ends.

The processor 120 may also identify whether the predetermined condition is satisfied in a relationship with a process that is being performed, based on a type of content that is being reproduced by the electronic apparatus and a remaining time of the content.

To this end, the clothing processing apparatus 100 may receive information on a context including information on the type of content that is being reproduced by the electronic apparatus. In addition, when the electronic apparatus receives a broadcast content in real time, the clothing processing apparatus 100 may also receive information on a context including hourly broadcast information (for example, electronic program guide (EPG)) from the electronic apparatus or another electronic apparatus connected to the electronic apparatus.

The type of content may be various types such as a movie, a drama, an advertisement, news, and a game. When the type of content is a movie, a drama, or a game, it is not different from embodiments described with reference to FIGS. 3A to 3C.

However, when the content that is being reproduced by the electronic apparatus is an advertisement, the processor 120 may identify whether the predetermined condition is satisfied based on the remaining time of the process that is being performed and the remaining time of the advertisement that is being reproduced by the electronic apparatus.

Specifically, when the remaining time of the process that is being performed is shorter than the remaining time of one or more consecutive advertisements that are being provided by the electronic apparatus, and a difference between the remaining times is shorter than the second threshold time described above, the processor 120 may identify whether the predetermined condition is satisfied.

Figure 3D:
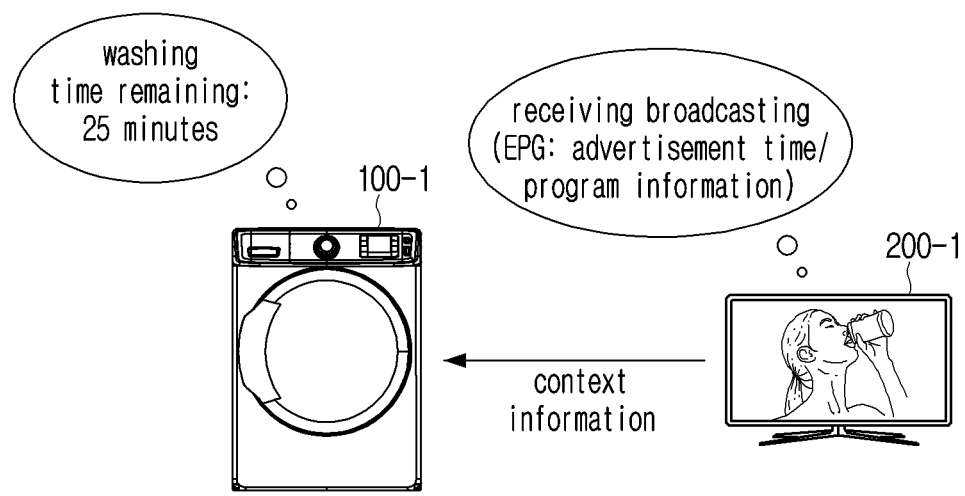

In this regard, referring to FIG. 3D, it illustrates a state in which a clothing processing apparatus 100-1, which is a washing machine, is performing a washing process, and an electronic apparatus 200-1, which is a TV, is providing an advertisement received through broadcasting. FIG. 3D assumes a situation in which a remaining time of the washing process that is being performed by the clothing processing apparatus 100-1 is 25 minutes, and a remaining time of one or more consecutive advertisements that are being provided by the electronic apparatus 200-1 is 20 minutes.

When the second threshold time is set to 20 minutes, the remaining time of the washing process that is being performed is longer than the remaining time of the advertisement (advertisements) by 5 minutes (less than 20 minutes), and thus, the clothing processing apparatus 100-1 may identify that the predetermined condition is satisfied.

In this case, the clothing processing apparatus 100-1 may change the remaining process of the washing process. As an example, the clothing processing apparatus 100-1 may decrease the remaining time of the washing process so that the washing process ends before the advertisement(s) ends. In this case, the user may take out the clothing from the clothing processing apparatus 100-1 before other content (for example, news, a drama, or a movie) starts following the advertisement(s).

It has been assumed and illustrated in FIGS. 3A to 3D that the electronic apparatus 200-1 is the TV, but the electronic apparatus 200-1 does not necessarily need to be the TV, and may be various types of electronic apparatuses capable of playing a content.

Figure 4:
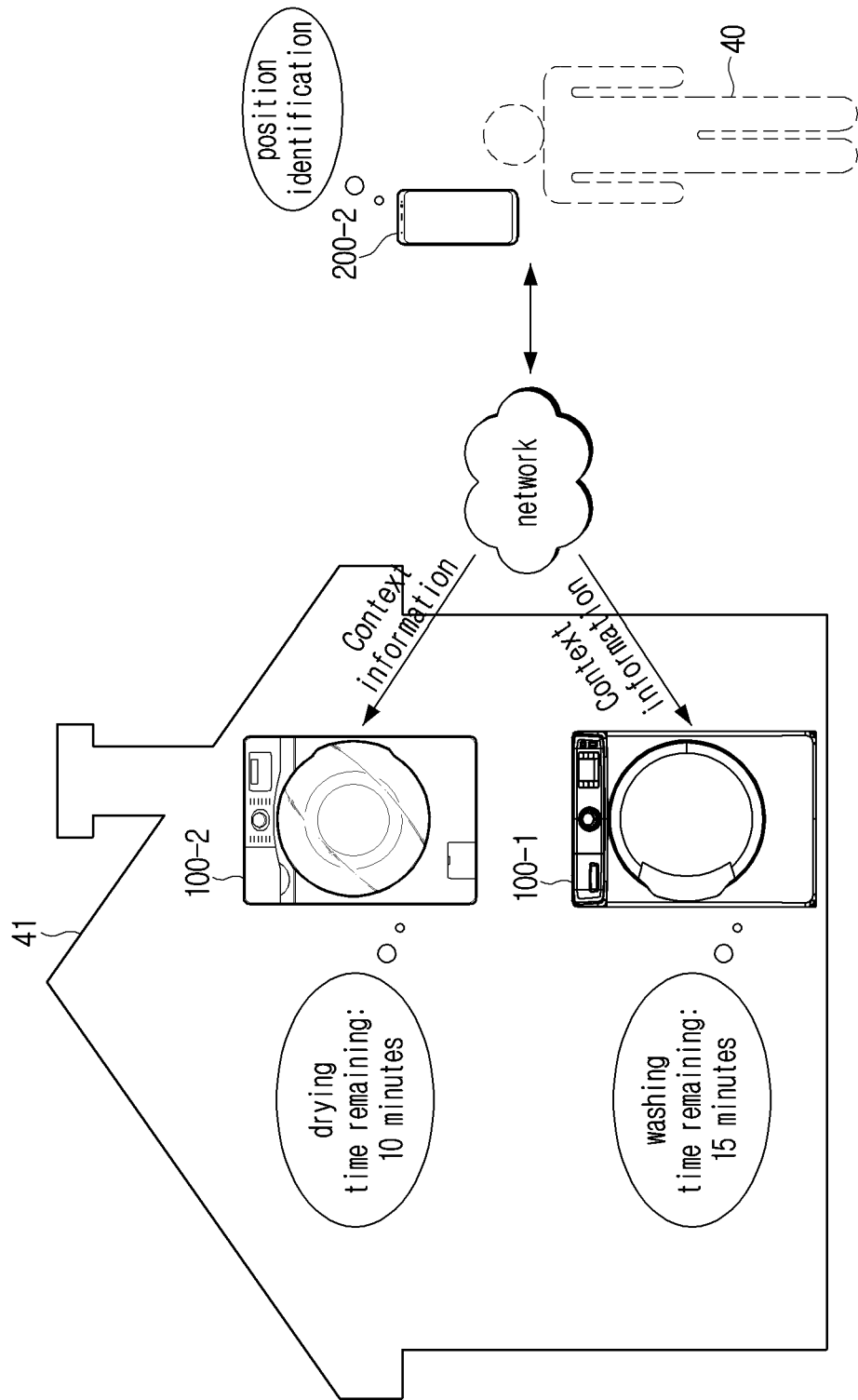
FIG. 4 is a view for describing an example in which a clothing processing apparatus identifies whether a predetermined condition is satisfied, based on information on a context including a position of an electronic apparatus according to an embodiment of the disclosure.

FIG. 4 is a view for describing an example in which the clothing processing apparatus identifies whether a predetermined condition is satisfied, based on information on a context including a position of an electronic apparatus according to an embodiment of the disclosure.

According to an embodiment, the information on the context of the electronic apparatus may include information on a position of the electronic apparatus. In this case, the processor 120 may identify that the predetermined condition is satisfied when it is identified that the position of the electronic apparatus becomes distant from a place where the clothing processing apparatus 100 is positioned by a threshold distance or more during a period in which the process is performed, based on the received information on the context.

Referring to FIG. 4, a situation in which the clothing processing apparatus 100-1, which is the washing machine, is performing a washing process, the clothing processing apparatus 100-2, which is the drying machine, is performing a drying process, and information on a context including information on a position of an electronic apparatus 200-2 implemented as a smartphone is transmitted to the clothing processing apparatuses 100-1 and 100-2 is assumed.

The information on the position of the electronic apparatus 200-2 may be identified based on a global positioning system (GPS) and be transmitted to the clothing processing apparatuses 100-1 and 100-2. In this case, the information on the position of the electronic apparatus 200-2 may be transmitted to the clothing processing apparatuses 100-1 and 100-2 through at least one server apparatus and/or a relay apparatus.

Alternatively, the information on the position of the electronic apparatus 200-2 may be identified by at least one server apparatus based on connection information between at least one relay apparatus (for example, a Wi-Fi router) and the electronic apparatus 200-2. For example, when it is identified the electronic apparatus 200-2 is connected to a relay apparatus spaced apart from a house 41 by a predetermined distance or more, the server apparatus may identify that the electronic apparatus 200-2 travels from the house 41 by a predetermined distance or more. In addition, the server apparatus may transmit the information on the position of the electronic apparatus 200-2 to the clothing processing apparatuses 100-1 and 100-2.

Alternatively, the information on the position of the electronic apparatus 200-2 may be identified by the server apparatus based on an intensity of a signal transmitted and received between at least one relay apparatus and the electronic apparatus 200-2. In this case, the server apparatus may identify the position of the electronic apparatus 200-2 using a position of a relay apparatus transmitting and receiving a signal having the strongest intensity to and from the electronic apparatus 200-2. In addition, the server apparatus may transmit the information on the position of the electronic apparatus 200-2 to the clothing processing apparatuses 100-1 and 100-2.

Alternatively, the server apparatus may identify that the electronic apparatus 200-2 travels from the house 41 by a predetermined distance or more when an intensity of a signal transmitted and received by the electronic apparatus 200-2 to and from a relay apparatus positioned in the house 41 is smaller than a predetermined value. In addition, the server apparatus may transmit the information on the position of the electronic apparatus 200-2 to the clothing processing apparatuses 100-1 and 100-2.

As described above, when it is identified that the position of the electronic apparatus 200-2 becomes distant from the house 41 by a predetermined distance or more in a state in which the process for clothing processing is being performed, the clothing processing apparatuses 100-1 and 100-2 may identify that the predetermined condition is satisfied.

In this case, at least one of the clothing processing apparatuses 100-1 and 100-2 may change and perform the remaining process so that the remaining time of the washing process and/or the drying process that is being performed is changed.

Specifically, the clothing processing apparatuses 100-1 and 100-2 may change the remaining process to increase the remaining time of the washing process and/or drying process that is being performed.

As a result, a situation in which the clothing is left in the clothing processing apparatus for a long time as a result of an end of the washing process or the drying process in a state in which the user 40 goes out may be prevented.

In FIG. 4, the clothing processing apparatuses 100-1 and 100-2 may identify that the predetermined condition is satisfied only when the position of the electronic apparatus becomes distant from the house 41 by a predetermined distance or more (or when the electronic apparatus is positioned outside the house 41) in a state in which the remaining time of the washing process that is being performed or the drying process that is being performed is less than a third threshold time.

The third threshold time may be set to a time corresponding to a predetermined percentage (for example, 20%, 30%, 40%, or 50%) of the entire process, but is not limited thereto.

As an example, a case where the third threshold time set for the clothing processing apparatus 100-2, which is the drying machine, is 40 minutes may be assumed. In addition, when it is identified that the position of the electronic apparatus becomes distant from the house 41 by a predetermined distance or more in a state in which the remaining time of the drying process that is being performed is 10 minutes as illustrated in FIG. 4, the clothing processing apparatus 100-2 may identify that the predetermined condition is satisfied.

On the other hand, even though the position of the electronic apparatus becomes distant from the house 41 by a predetermined distance or more, when the remaining time of the drying process that is being performed is longer than 40 minutes, the clothing processing apparatus 100-2 may identify that the predetermined condition has not yet been satisfied.

When the third threshold time is set as described above, a situation in which the remaining time of the washing process or the drying process increases when the user does not want such a situation may be prevented. This is because, for example, when the third threshold time is not set, a problem that the remaining time increases due to an inevitable change of the washing process even though the user who clearly recognizes that the washing process that is being performed by the clothing processing apparatus 100-1 returns to the house 41 immediately after going out for a short time at an early stage of the washing process (before the original remaining time of the washing process has elapsed) may occur.

Figure 5A:
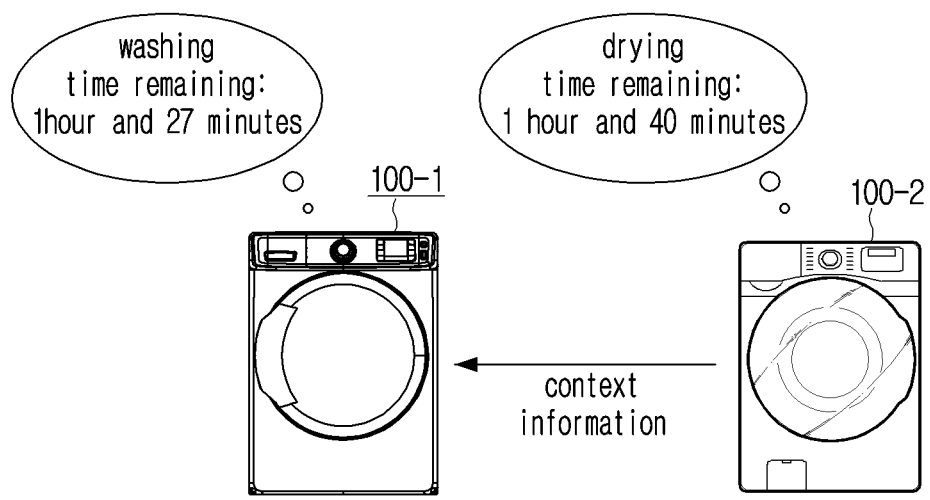
FIGS. 5A and 5B are views for describing various examples in which a clothing processing apparatus identifies whether a predetermined condition is satisfied, based on information on a context of an electronic apparatus that is performing another process according to various embodiments of the disclosure.
Figure 5B:
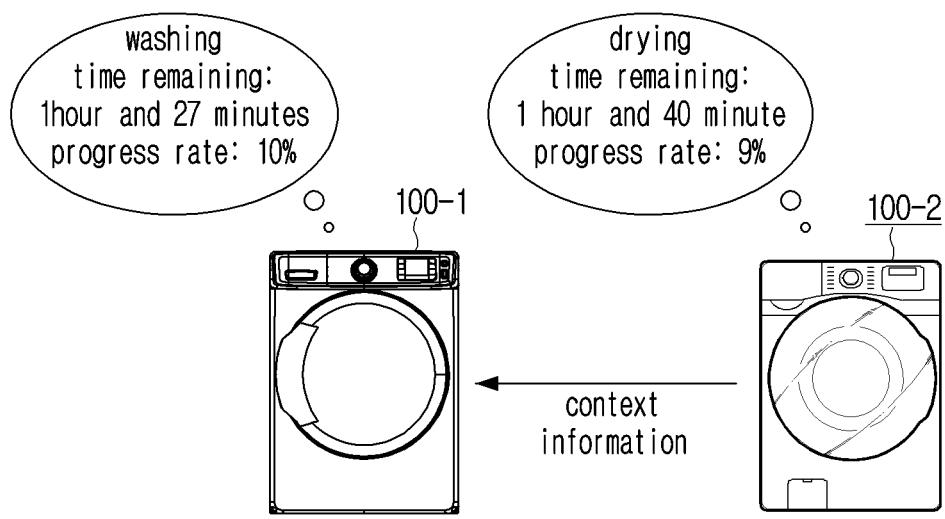

FIGS. 5A and 5B are views for describing various examples in which a clothing processing apparatus identifies whether a predetermined condition is satisfied, based on information on a context of an electronic apparatus that is performing another process according to various embodiments of the disclosure.

Referring to FIGS. 5A and 5B, the information on the context of the electronic apparatus may include information on a remaining time until an end of a process that is being performed by the electronic apparatus. In this case, the processor 120 may identify that the predetermined condition is satisfied on the basis of a relationship between a first remaining time of a first process that is being performed by the electronic apparatus and a second remaining time of a second process that is being performed by the clothing processing apparatus 100, based on the received information on the context.

In this case, the electronic apparatus may be a clothing processing apparatus different from the clothing processing apparatus 100. For example, the clothing processing apparatus 100 may be a washing machine and the electronic apparatus may be a drying machine.

For example, when it is identified that the first remaining time and the second remaining time are different from each other and a difference between the first remaining time and the second remaining time is less than a fourth threshold time, the processor 120 may identify that the predetermined condition is satisfied. The fourth threshold time may be set according to a type (a washing machine, a drying machine or the like) of the clothing processing apparatus 100.

In this regard, FIG. 5A illustrates a situation in which the clothing processing apparatus 100-1, which is the washing machine, is performing a washing process, and the clothing processing apparatus 100-2, which is the drying machine, is performing a drying process. Referring to FIG. 5A, the remaining time of the washing process is 1 hour and 27 minutes, and the remaining time of the drying process is 1 hour and 40 minutes.

In this case, the clothing processing apparatus 100-1 may receive information on the context from the clothing processing apparatus 100-2 and determine a relationship between the remaining times.

When the fourth threshold time set for the clothing processing apparatus 100-1 is 20 minutes, the difference between the remaining times is 13 minutes less than 20 minutes, and the processor 120 of the clothing processing apparatus 100-1 may thus identify that the predetermined condition is satisfied.

In this case, the clothing processing apparatus 100-1 may change the remaining process of the washing process that is being performed by the clothing processing apparatus 100-1. As an example, the clothing processing apparatus 100-1 may change the remaining process of the washing process so that a difference between the remaining time of the washing process and the remaining time of the drying process decreases.

However, in the situation of FIG. 5A, the remaining process of the washing process of the clothing processing apparatus 100-1, which is the washing machine, is not changed, but the remaining process of the drying process of the clothing processing apparatus 100-2, which is the drying machine, may also be changed.

The processor 120 may identify that the predetermined condition is satisfied, when it is identified that a ratio of a first remaining time of a first process that is being performed by the electronic apparatus (another clothing processing apparatus) to a total time of the first process and a ratio of a second remaining time of a second process that is being performed by the clothing processing apparatus 100 to a total time of the second process is a threshold ratio or more and the first remaining time and the second remaining time are different from each other.

The threshold ratio may be set to various ratios such as 50%, 60%, and 70%, but is not limited thereto.

Referring to FIG. 5B, situation in which a remaining time of the washing process that is being performed by the clothing processing apparatus 100-1, which is the washing machine, is 1 hour and 20 minutes, and a remaining time of the drying process that is being performed by the clothing processing apparatus 100-2, which is the drying machine, is 1 hour and 40 minutes is illustrated. In this case, a progress rate of the washing process is 10%, and a progress rate of the drying process is 9%. That is, a ratio of the remaining time of the washing process is 90%, and a ratio of the remaining time of the drying process is 91%.

When the threshold ratio is 70%, both of the ratios of the remaining times of the washing process and the drying process are 70% or more (90% and 91%), which is the threshold ratio, and the clothing processing apparatus 100-2 may thus identify that the predetermined condition is satisfied.

In this case, the clothing processing apparatus 100-2 may change the remaining process of the drying process that is being performed by the clothing processing apparatus 100-2. As an example, the clothing processing apparatus 100-2 may change the remaining process of the drying process so that a difference between the remaining time of the drying process and the remaining time of the washing process decreases.

However, in the situation of FIG. 5B, the remaining process of the drying process of the clothing processing apparatus 100-2, which is the drying machine, is not changed, but the remaining process of the washing process of the clothing processing apparatus 100-1, which is the washing machine, may also be changed.

When it is identified that at least one predetermined condition is satisfied according to the various embodiments described above, the processor 120 may change the remaining process of the process that is being performed. Hereinafter, various embodiments in which a remaining process of a process that is being performed by the clothing processing apparatus 100 is changed will be described with reference to FIGS. 6A to 6C and 7A and 7B.

The processor 120 according to an embodiment of the disclosure may adjust a performance time of at least one clothing processing operation included in the remaining process of the process that is being performed, when it is identified that at least one predetermined condition is satisfied.

The clothing processing operation may include operations such as washing, rinsing, dewatering, and soaking included in the washing process. In addition, the clothing processing operation may include operations such as drying and wrinkle prevention included in the drying process.

Alternatively, the processor 120 may add at least one clothing processing operation to the remaining process of the process that is being performed. In this case, the processor 120 may add at least one clothing processing operation included in the process to the remaining process of the process that is being performed or add a new clothing processing operation that was not included in the process to the remaining process of the process that is being performed.

Figure 6A:
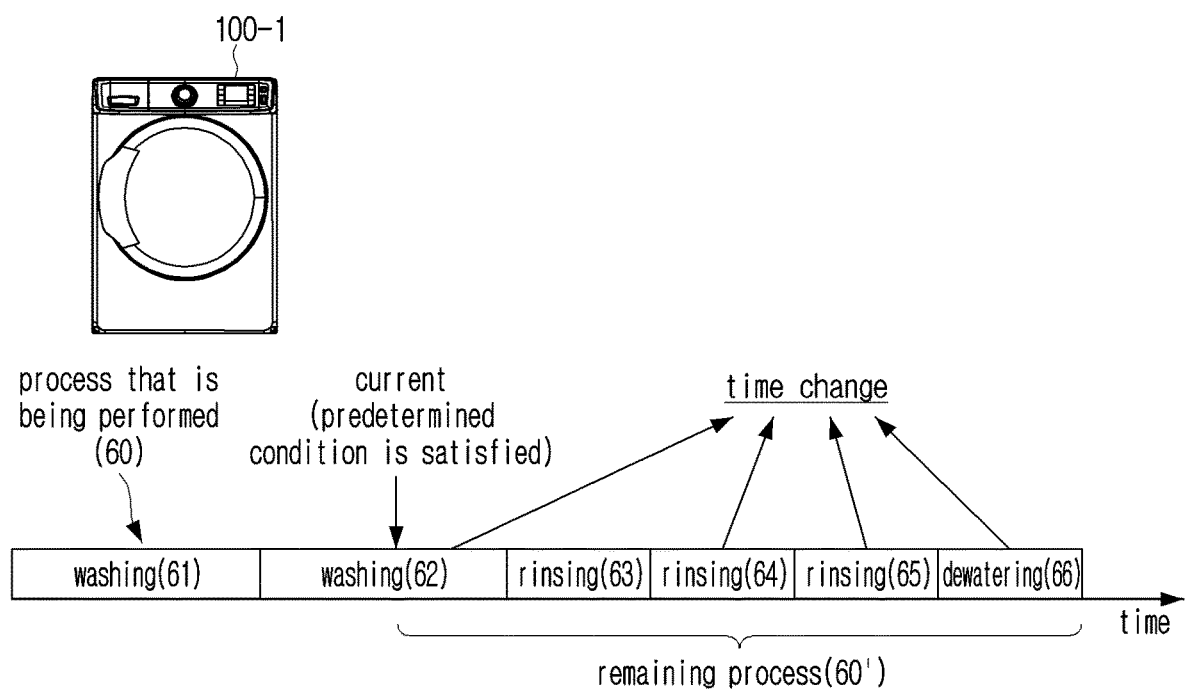
FIGS. 6A, 6B, and 6C are views for describing various examples in which a clothing processing apparatus implemented as a washing machine changes a remaining process of a clothing processing process according to various embodiments of the disclosure.
Figure 6B:
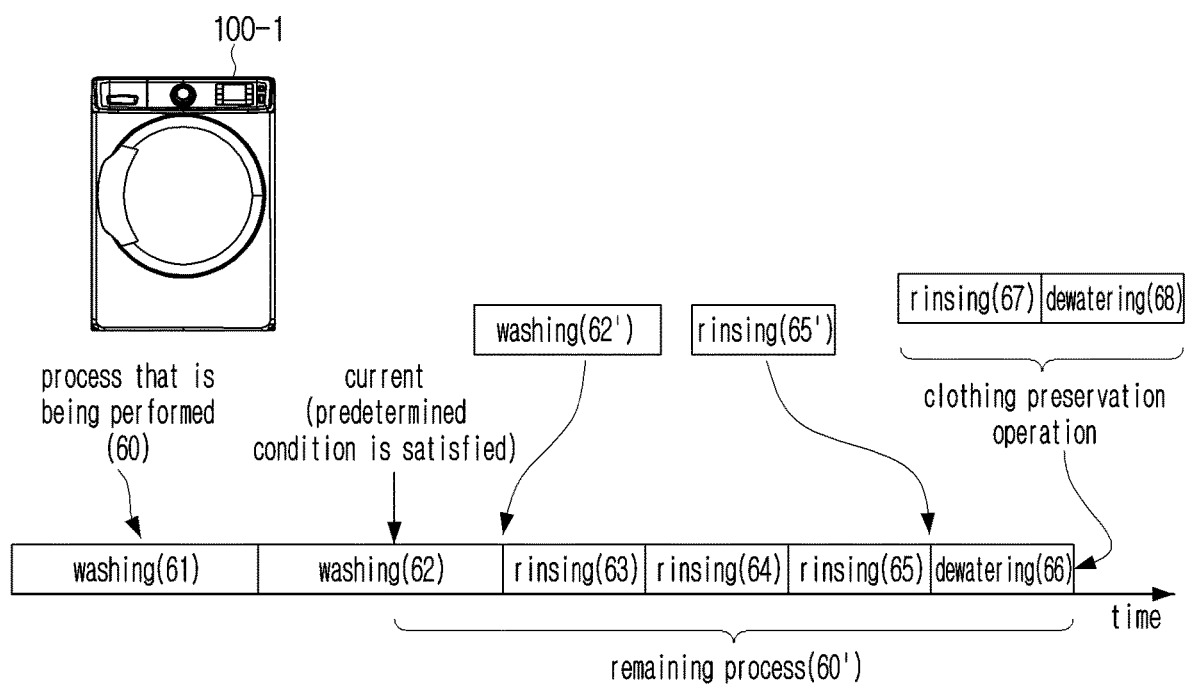
Figure 6C:
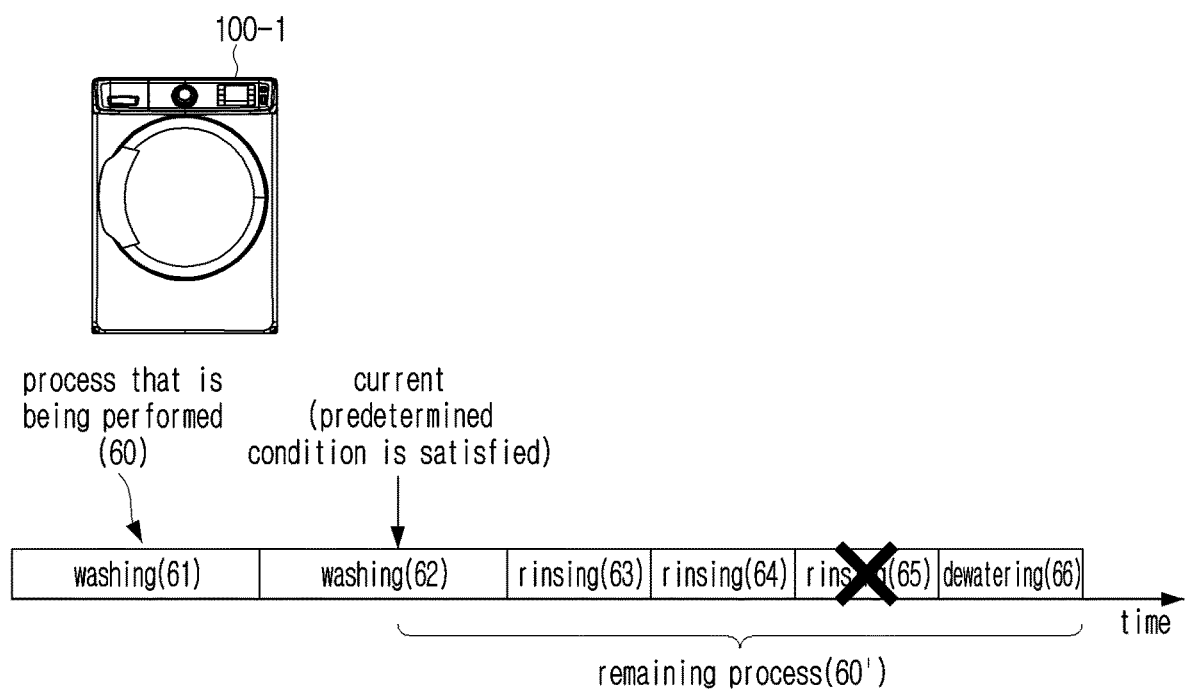

FIGS. 6A to 6C are views for describing various examples in which a clothing processing apparatus implemented as a washing machine changes a remaining process of a clothing processing process according to various embodiments of the disclosure.

Referring to FIGS. 6A to 6C, a situation in which the clothing processing apparatus 100-1, which is the washing machine, is performing a washing process 60 including two washing operations, three rinsing operations, and one dewatering operation is assumed.

In addition, when it is identified that at least one predetermined condition is satisfied, the clothing processing apparatus 100-1 may change a remaining process 60' of the washing process 60.

First, referring to FIG. 6A, the clothing processing apparatus 100-1 may adjust a performance time of at least one clothing processing operation included in the washing process 60.

Specifically, the clothing processing apparatus 100-1 may change a performance time of at least one of a washing operation 62, a rinsing operation 63, a rinsing operation 64, or a dewatering operation 66 performed after a point in time when it is identified that the predetermined condition is satisfied, in the washing process 60.

When the performance time of at least one clothing processing operation increases, a remaining time of the washing process 60 may increase, and when the performance time of at least one clothing processing operation decreases, the remaining time of the washing process 60 may decrease.

Referring to FIG. 6B, the clothing processing apparatus 100-1 may add at least one clothing processing operation to the washing process 60.

Specifically, the clothing processing apparatus 100-1 may add a washing operation 62' between the washing operation 62 and the rinsing operation 63 or add a rinsing operation 65' between the rinsing operation 65 and the dewatering operation 66.

In addition, the clothing processing apparatus 100-1 may further add a rinsing operation 67 and a dewatering operation 68 after an entire process of the original washing process 60 ends. The rinsing operation 67 and the dewatering operation 68 have a clothing preservation effect that may prevent a situation in which clothing left after the original washing process 60 ends is damaged or becomes dirty again.

As a result of adding at least one clothing processing operation as described above, the remaining time of the washing process 60 may increase.

Referring to FIG. 6C, the clothing processing apparatus 100-1 may exclude at least one clothing processing operation included in the washing process 60 from the washing process 60.

As a specific example, the clothing processing apparatus 100-1 may not perform one (for example, a rinsing operation 65) of three rinsing operations 63 to 65 of the washing process 60. In this case, the remaining time of the washing process 60 may decrease.

Figure 7A:
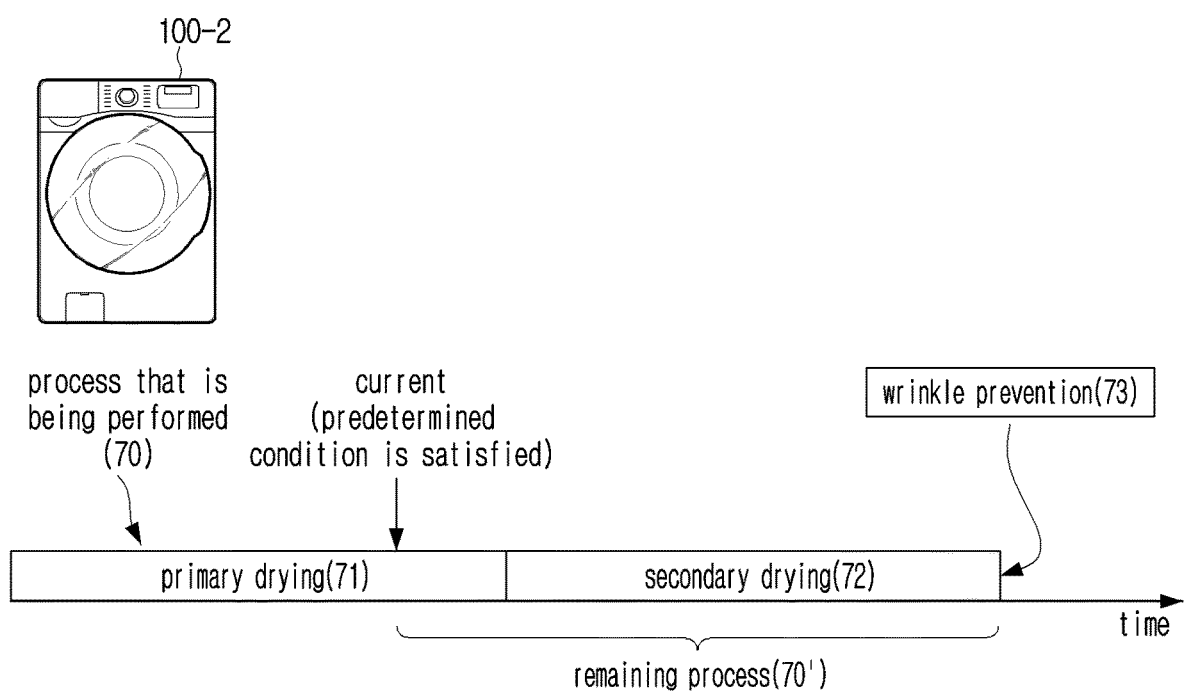
FIGS. 7A and 7B are views for describing various examples in which a clothing processing apparatus implemented as a drying machine changes a remaining process of a clothing processing process according to various embodiments of the disclosure.
Figure 7B:
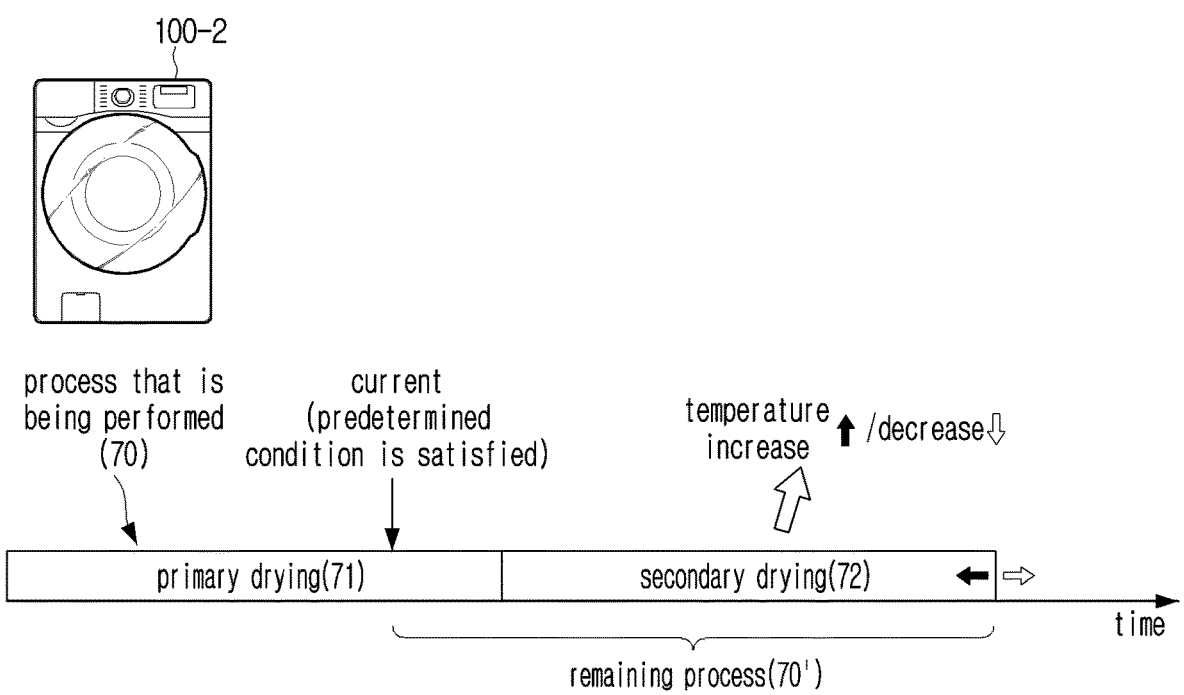

FIGS. 7A and 7B are views for describing various examples in which a clothing processing apparatus implemented as a drying machine changes a remaining process of a clothing processing process according to various embodiments of the disclosure.

Referring to FIGS. 7A and 7B, a situation in which the clothing processing apparatus 100-2, which is the drying machine, is performing a drying process 70 including a primary drying operation 71 and a secondary drying operation 72 is assumed.

The first drying operation and the second drying operation may correspond to a plurality of operations divided from the drying process by various references. For example, drying temperatures at which drying operations are performed in each of the first drying operation and the second drying operation may be different from each other. Alternatively, a progress rate of the drying process may be calculated based on an amount of moisture contained in clothing that is being dried or a humidity of air (inside a drum) sensed through a sensor, and the primary drying operation and the secondary drying operation may be divided on the basis of a point in time when a specific numerical value of drying progress rate (for example, 50%) is achieved. However, the division of the drying process may be changed depending on a design/implementation manner of the clothing processing apparatus 100-2, which is the drying machine, and the drying process 70 is not necessarily divided into the primary drying operation and the secondary drying operation, but may be defined as only one operation (drying operation) or may be defined as including three or more operations.

When it is identified that at least one predetermined condition is satisfied, the clothing processing apparatus 100-2 may change a remaining process 70' of the drying process 70.

As an example, referring to FIG. 7A, the clothing processing apparatus 100-2, which is the drying machine, may add a wrinkle prevention operation 73 to the drying process 70. The wrinkle prevention operation 73 has a clothing preservation effect that may prevent a situation in which the clothing left after the original drying process 70 ends is damaged, for example, wrinkles.

In this case, the remaining time of the drying process 70 may increase.

As an example, referring to FIG. 7B, the clothing processing apparatus 100-2, which is the drying machine, may change a temperature set for at least one of the drying operations 71 and 72 performed after a point in time when it is identified that the predetermined condition is satisfied.

Referring to FIG. 7B, the clothing processing apparatus 100-2 may increase or decrease a temperature at the time of the secondary drying operation 72. When a temperature set for the secondary drying operation 72 increases, a time required for the secondary drying operation 72 may also decrease as a result of sensing that an amount of moisture contained in the clothing quickly reaches a target value. As a result, the remaining time of the drying process 70 may decrease.

On the contrary, when the temperature set for the secondary drying operation 72 decreases, the time required for the secondary drying operation 72 may increase, such that the remaining time of the drying process 70 may increase.

Specifically, the clothing processing apparatus 100-2, which is the drying machine, may include a compressor, a heat exchanger, a fan, and the like, for generating warm air, and may increase/decrease a drying temperature in an operation such as the secondary drying operation 72 by increasing/decreasing an operating frequency of the compressor.

In the clothing processing apparatus 100-2, which is the drying machine, a time required to perform the drying operation may be pre-stored for each drying temperature of at least one drying operation (for example, the primary drying operation or the secondary drying described above). For example, a performance time of the secondary drying operation whose drying temperature is 60° C. may be set to 1 hour, a performance time of the secondary drying operation whose drying temperature is 65° C. may be set to 55 minutes, and a performance time of the secondary drying operation whose drying temperature is 70° C. may be set to 50 minutes.

When the remaining time of the drying process 70 needs to be decreased by 5 minutes in a state in which a drying temperature set for the secondary drying operation is 65° C. and a performance time set for the secondary drying operation is 55 minutes, the clothing processing apparatus 100-2 may change the drying temperature of the secondary drying operation to 70° C. and then perform the drying process 70.

A (target) drying temperature matched to the changed performance time of the drying operation may be inferred through at least one artificial intelligence model. The artificial intelligence model may be data in the form of a neural network model trained to output a drying temperature when the changed performance time of the drying operation (for example, the secondary drying operation) is input, and may be stored in at least one server apparatus capable of communicating with the clothing processing apparatus 100-2 or the clothing processing apparatus 100-2.

As a specific example, when the remaining time of the drying process 70 needs to be decreased by 15 minutes, the clothing processing apparatus 100-2 may transmit information on a target performance time obtained by subtracting 15 minutes from the performance time of the (original) secondary drying operation 72 to the server apparatus. In addition, the server apparatus may identify a target drying temperature of the secondary drying operation by inputting the information on the target performance time into the artificial intelligence model. In addition, the clothing processing apparatus-100-2 may change the drying process 70 by setting the drying temperature of the secondary drying operation 72 to the target drying temperature received from the server apparatus.

Although not illustrated through FIG. 7B, as an example, the clothing processing apparatus 100-2, which is the drying machine, may adjust the time of the secondary drying operation 72 by increasing/decreasing a rotational speed of the fan emitting warm air. In this case, as the rotation speed of the fan increases, the performance time of the secondary drying operation 72 may decrease, and as the rotational speed of the fan decreases, the performance time of the secondary drying operation 72 may increase. The clothing processing apparatus 100-2 may adjust the rotation speed of the fan by controlling an output of a motor that drives rotation of the fan.

The processor 120 may change the remaining process of the process that is being performed, in a different manner depending on what the satisfied predetermined condition is. As described above through each of the embodiments, it may be changed whether the remaining time of the process increases or decreases for each predetermined condition. In addition, a degree (time length) to which the remaining time increases or decreases may also be changed for each predetermined condition.

Figure 8:
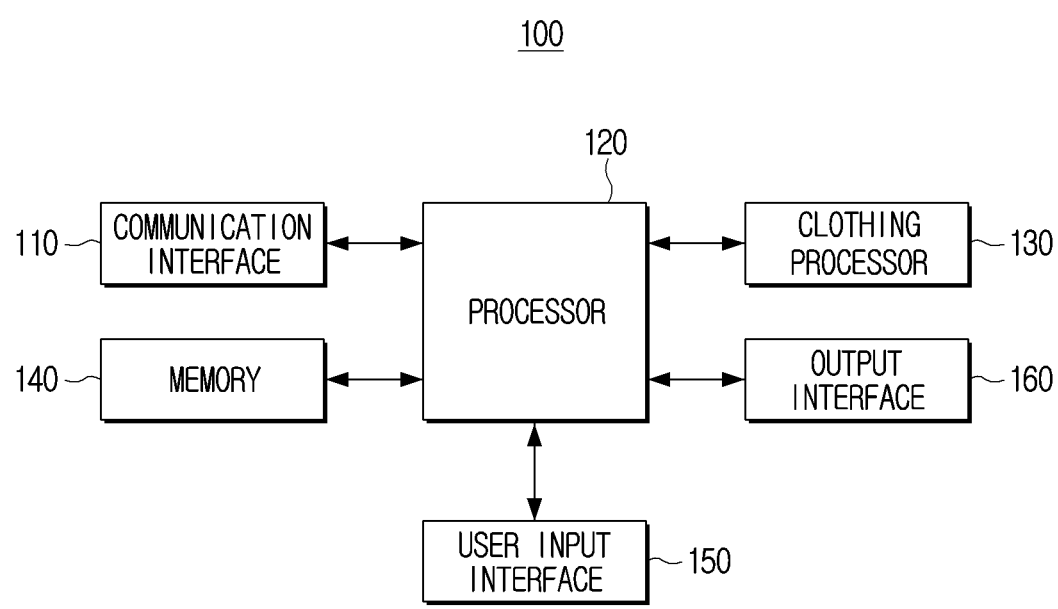
FIG. 8 is a block diagram for describing detailed components of a clothing processing apparatus according to an embodiment of the disclosure.

FIG. 8 is a block diagram for describing detailed components of a clothing processing apparatus according to an embodiment of the disclosure.

Referring to FIG. 8, the clothing processing apparatus 100 may further include a clothing processor 130, a memory 140, a user input interface 150, an output interface 160, and the like, in addition to the communication interface 110 and the processor 120.

The processor 120 may transmit the information on the context of the clothing processing apparatus 100 to at least one external apparatus through the communication interface 110. For example, the processor 120 may transmit information on a (clothing processing) process that is currently being performed to a server apparatus and/or an electronic apparatus included in the IoT system.

The information on the process may include information on a type and a performance time of each operation included in the process, a start time of the process, a remaining time of the process, and the like.

In addition, when the process for clothing processing ends, the processor 120 may transmit a notification regarding the end of the process to the server apparatus and/or the electronic apparatus through the communication interface 110. As a result, the electronic apparatus implemented as a smartphone or a TV may provide the notification regarding the end of the process to the user.

In addition, when the remaining process of the process for clothing processing is changed, the processor 120 may transmit information on the changed process to the server apparatus and/or the electronic apparatus.

The clothing processor 130 is a component for performing a process including the various clothing processing operations described above under the control of the processor 120.

When the clothing processing apparatus 100 is the washing machine, the clothing processor 130 may include various components for performing at least one of a washing operation, a rinsing operation, a dewatering operation, or a drying operation.

As an example, the clothing processor 130 may include a tub for storing water, a drum in which laundry (clothing) is put and washing/rinsing/dewatering/drying, and the like, are performed on the laundry (clothing), a motor for rotating the drum, a water supply valve for supplying water from the tub to the drum, a pump for discharging water from the drum, and the like. However, the components of the clothing processor 130 of the clothing processing apparatus 100 may be implemented in various manners known in the related art.

When the clothing processing apparatus 100 is the drying machine, the clothing processor 130 may include various components for performing operations such as drying and wrinkle prevention.

As an example, the clothing processor 130 may include a drum in which clothing is put and drying is performed on the clothing, a motor for rotating the drum, a heater (that may include a compressor, a heat exchanger, a fan, and the like) for providing warm air having a predetermined temperature into the drum, and the like. However, the components of the clothing processor 130 of the clothing processing apparatus 100, which is the drying machine, may be implemented in various manners (for example, a manner of heating air using an electric heater, a manner of generating heat by burning gas, and the like) known in the related art.

When the clothing processing apparatus 100 is the drying machine, a sensor for measuring an amount of moisture contained in the clothing may be provided inside the drum. Specifically, the sensor may include one or more electrodes, and in this case, the processor 120 may measure an amount of moisture contained in the clothing or a humidity of air inside the drum based on an intensity of a current flowing through the clothing in contact with the electrodes or the air inside the drum in contact with the electrodes. In addition, the processor 120 may determine a progress rate of the drying based on the measured amount of moisture or the measured humidity.

When the clothing processing apparatus 100 is implemented as another type of clothing processing apparatus (for example, an apparatus for storing and managing clothing) other than the washing machine and the drying machine, the components of the clothing processor 130 may also be changed.

The memory 140 is a component for storing an operating system (OS) for controlling general operations of the components of the clothing processing apparatus 100 and at least one instruction or data related to the components of the clothing processing apparatus 100. The processor 120 may perform the operations according to the various embodiments described above by executing at least one instruction stored in the memory 140.

The memory 140 may include a nonvolatile memory such as a read only memory (ROM) and a flash memory, and may include a volatile memory such as a dynamic random access memory (DRAM). In addition, the memory 140 may include a storage such as a hard disk and a solid state drive (SSD).

The memory 140 may store information on a process performed by the clothing processing apparatus 100 in the form of a program or an instruction. The program or the instruction may be defined as a control command code used by the processor 120 to control the clothing processor 130.

The user input interface 150 is a component for receiving a user input.

The processor 120 may receive a user command for performing at least one process through the user input interface 150.

To this end, the user input interface 150 may include at least one button, a touch screen, and the like, and may also include a microphone, an image sensor or the like.

The output interface 160 is a component for providing various information to the user. The output interface 160 may include at least one display and a speaker.

As an example, when the washing process of the clothing processing apparatus 100 implemented as the washing machine ends, the processor 120 may visually and/or audibly provide a notification regarding the end of the washing process through the display and/or the speaker.

As an example, when the remaining process of the washing process of the clothing processing apparatus 100 implemented as the washing machine is changed, the processor 120 may control the output interface 160 to visually/audibly notify the user that the washing process that is being performed has changed. In this case, the display of the output interface 160 may display information on the changed remaining time.

Figure 9A:
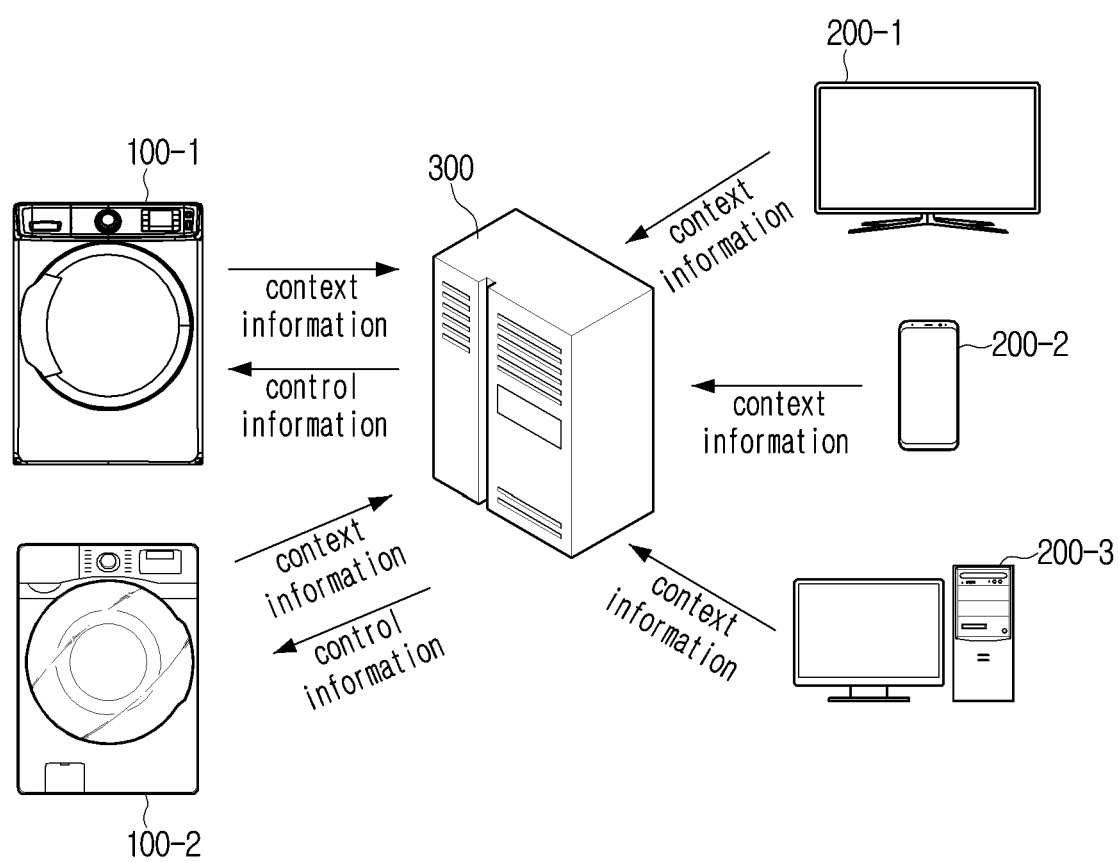
FIGS. 9A and 9B are views for describing operations and components of a server apparatus that controls at least one clothing processing apparatus and at least one electronic apparatus included in an IoT system according to various embodiments of the disclosure.
Figure 9B:
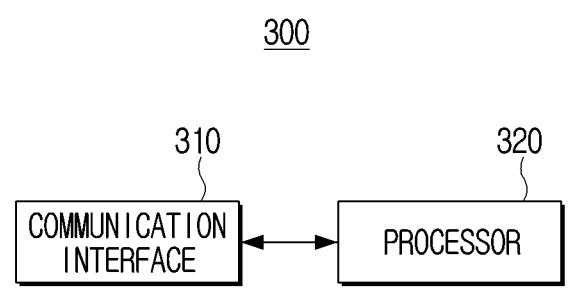

FIGS. 9A and 9B are views for describing operations and components of a server apparatus that controls at least one clothing processing apparatus and at least one electronic apparatus included in an IoT system according to various embodiments of the disclosure.

Referring to FIG. 9A, a server apparatus 300 may receive information on a context from clothing processing apparatuses 100-1 and 100-2 and electronic apparatuses 200-1, 200-2, and 200-3.

In addition, the server apparatus 300 may control a washing process/drying process performed by the clothing processing apparatuses 100-1 and 100-2 based on the received information on the context.

Hereinafter, operations of the server apparatus 300 will be described in more detail through components of the server apparatus 300 illustrated in FIG. 9B. Referring to FIG. 9B, the server apparatus 300 may include a communication interface 310 and a processor 320.

The communication interface 310 may be connected to at least one clothing processing apparatus and at least one electronic apparatus included in the IoT system.

The communication interface 310 may transmit and receive various information to and from external electronic apparatuses through a communication protocol such as transmission control protocol/Internet protocol (TCP/IP), user datagram protocol (UDP), hyper text transfer protocol (HTTP), secure hyper text transfer protocol (HTTPS), file transfer protocol (FTP), secure file transfer protocol (SFTP), and message queuing telemetry transport (MQTT).

To this end, the communication interface 310 may be connected to at least one clothing processing apparatus or electronic apparatus based on a network implemented through wired communication and/or wireless communication. The communication interface 310 may also be connected to external apparatuses through one or more external servers (for example, Internet service providers (ISPs)) providing a network.

The processor 320 is a component for controlling general operations and components of the server apparatus 300. The processor 320 may be implemented as a general-purpose processor such as a central processing unit (CPU) or an application processor (AP), a graphics-dedicated processor such as a graphics processing unit (GPU) or a vision processing unit (VPU), or an artificial intelligence-dedicated processor such as a neural processing unit (NPU). In addition, the processor 320 may include a volatile memory such as a static random access memory (SRAM).

When at least one clothing processing apparatus is performing a process, the processor 320 may identify whether a relationship between a remaining time until an end of the process that is being performed and the context of at least one electronic apparatus satisfies at least one predetermined condition described above, based on the received information on the context.

In addition, when it is identified that the predetermined condition is satisfied, the processor 320 may control the clothing processing apparatus to change a remaining process of the process that is being performed through the communication interface 310.

Specifically, the processor 320 may transmit control information for changing the remaining process of the process that is being performed by the clothing processing apparatus to the clothing processing apparatus through the communication interface 310. As a result, the remaining process of the process that is being performed by the clothing processing apparatus may be changed.

The control information may include information on the process to be changed. That is, the control information may include information on whether the remaining time of the process that is being performed increases or decreases, information on a length of the time that increases or decreases, information on an operation to be added to the process that is being performed, information on an operation to be excluded from the process that is being performed, and the like. In addition, when the process to be changed is the drying process, the control information may also include information on a drying temperature to be newly set for at least one drying operation included in the drying process.

In addition, the processor 320 may also transmit information on the process whose remaining process is changed to a user terminal apparatus through the communication interface 310. As a result, the user terminal apparatus may notify the user that the residual process of the process that is being performed by the clothing processing apparatus has been changed.

The processor 320 of the server apparatus 300 may control the clothing processing apparatuses 100-1 and 100-2 and the electronic apparatuses 200-1, 200-2, and 200-3 in various manners even after the process of the at least one clothing processing apparatus ends.

Figure 10A:
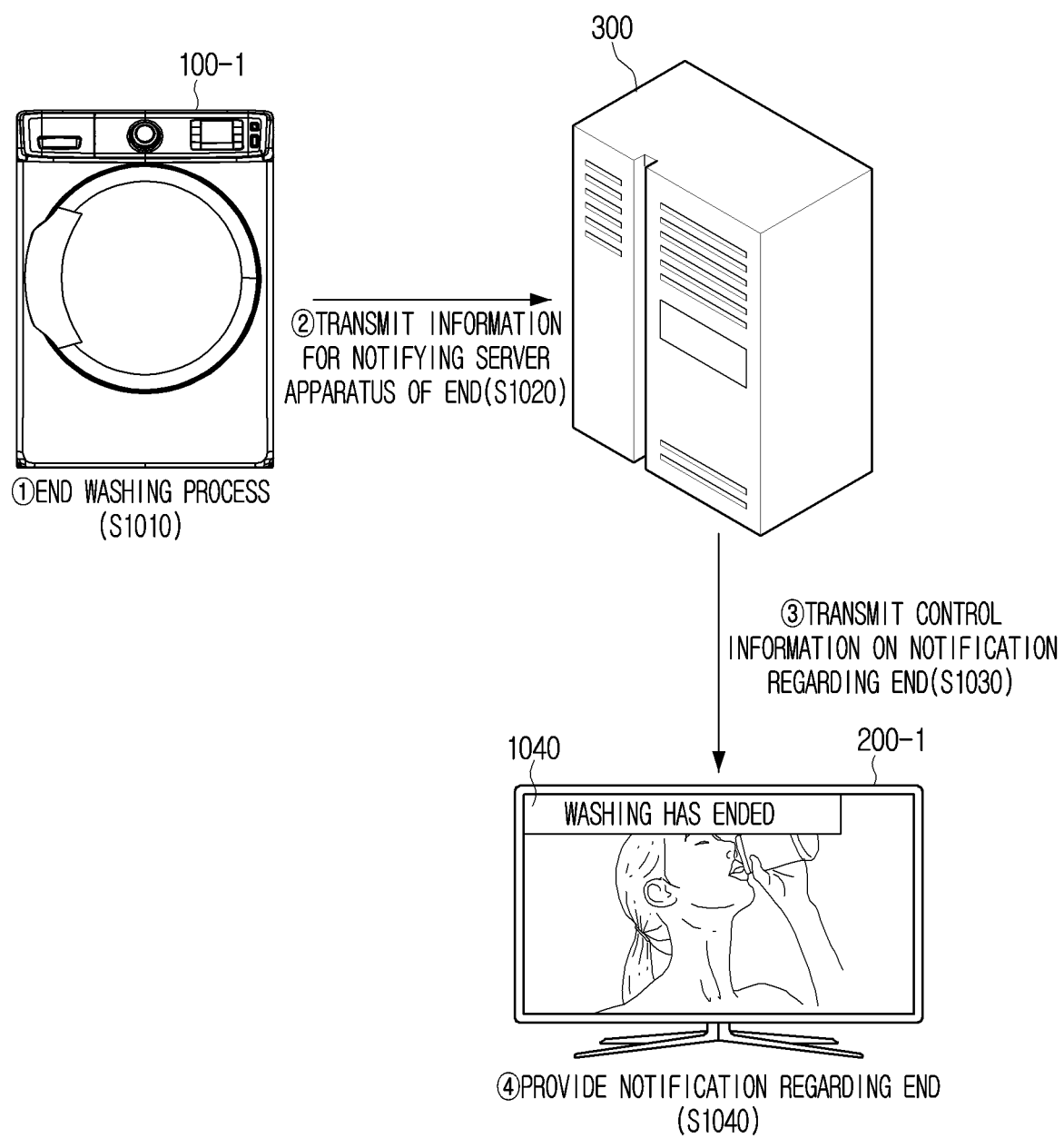
FIGS. 10A and 10B are views for describing operations of a server apparatus controlling a clothing processing apparatus and an electronic apparatus after a clothing processing process of the clothing processing apparatus ends according to various embodiments of the disclosure.
Figure 10B:
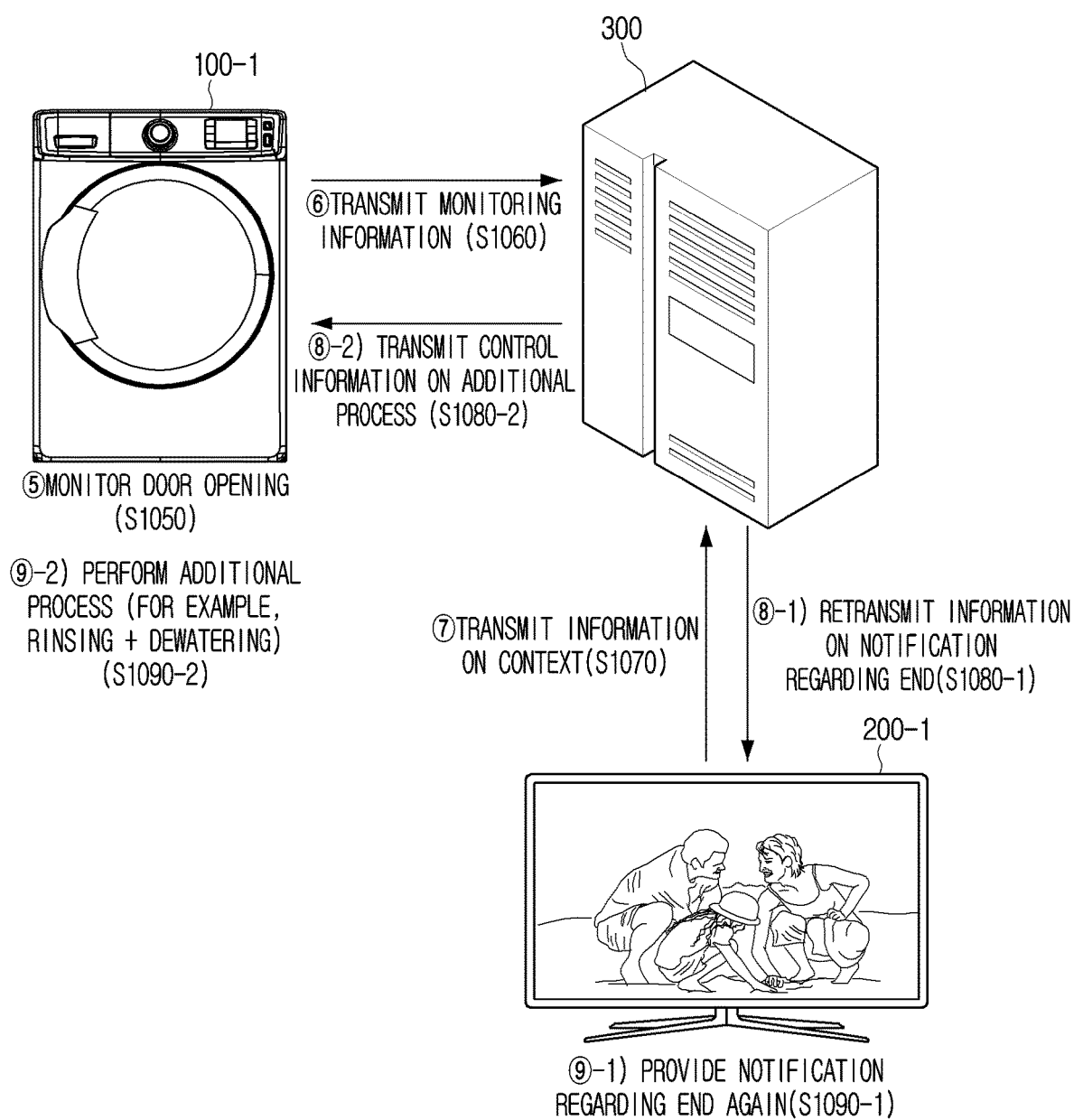

FIGS. 10A and 10B are views for describing operations of a server apparatus controlling a clothing processing apparatus and an electronic apparatus after a clothing processing process of the clothing processing apparatus ends according to various embodiments of the disclosure.

Referring to FIG. 10A, when a washing process ends at operation S1010, the clothing processing apparatus 100-1, which is the washing machine, may transmit information for notifying the server apparatus 300 of the end of the washing process to the server apparatus 300 at operation S1020.

In this case, the server apparatus 300 may transmit control information on the notification regarding the end to the electronic apparatus 200-1 implemented as a TV at operation S1030. As a result, the electronic apparatus 200-1 may output a message 1040 for notifying the user of the end of the washing process at operation S1040.

Referring to FIG. 10B, after the washing process ends, the clothing processing apparatus 100-1 may monitor door opening at operation S1050. That is, the clothing processing apparatus 100-1 may identify whether a door of the clothing processing apparatus 100-1 has been opened by the user after the washing process ends. To this end, the clothing processing apparatus 100-1 may be provided with at least one sensor for sensing whether the door has been opened or closed. This is because whether the door is opened or closed may be matched to whether the user takes out the clothing.

In addition, the clothing processing apparatus 100-1 may transmit monitoring information on the door opening to the server apparatus 300 at operation S1060.

The server apparatus 300 may receive information on a context of the electronic apparatus 200-1 at operation S1070.

When it is identified that the door of the clothing processing apparatus 100-1 is not opened even though a predetermined first threshold time has elapsed since the washing process has ended, the server apparatus 300 may control the clothing processing apparatus 100-1 to provide an additional notification or perform an additional process.

As a specific example, when the electronic apparatus 200-1 is providing an advertisement, the server apparatus 300 may transmit control information to the electronic apparatus 200-1 to provide the notification regarding the end of the washing process again at operation S1080-1.

In this case, the electronic apparatus 200-1 may provide a message or the like for notifying the user of the end of the washing process again at operation S1090-1.

As another example, when the electronic apparatus 200-1 is providing a movie, a drama, a game, or the like, the server apparatus 300 may transmit control information on an additional process to the clothing processing apparatus 100-1 at operation S1080-2.

In this case, the clothing processing apparatus 100-1 may perform an additional process including operations such as rinsing and dewatering based on the control information at operation S1090-2. As a result, a situation in which laundry (clothing) is left in the clothing processing apparatus 100-1 to become dirty or be damaged even though the washing process ends may be prevented.

Even when a position of the electronic apparatus 200-2 implemented as the smartphone, becomes distant from a predetermined distance or more as illustrated in FIG. 4 after the washing process of the clothing processing apparatus 100-1 ends, the server apparatus 300 may transmit control information for causing the clothing processing apparatus 100-1 to perform an additional process to the clothing processing apparatus 100-1.

Only a case of the clothing processing apparatus 100-1, which is the washing machine, has been illustrated in FIGS. 10A and 10B, but a similar embodiment may be assumed even in a situation in which the drying process of the clothing processing apparatus 100-2, which is the drying machine, ends. For example, when the door opening is not sensed even though a predetermined first threshold time has elapsed since the drying process has ended, the clothing processing apparatus 100-2 may perform an additional process (for example, wrinkle prevention) under the control of the server apparatus 300.

Figure 11:
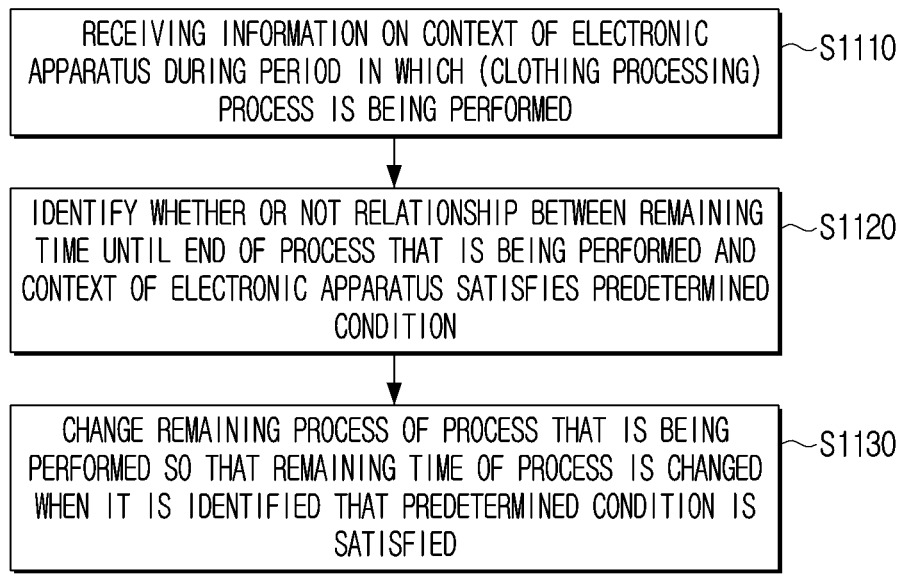
FIG. 11 is a flowchart for describing a control method of a clothing processing apparatus according to an embodiment of the disclosure.

FIG. 11 is a flowchart for describing a control method of a clothing processing apparatus according to an embodiment of the disclosure. In this case, the clothing processing apparatus may be included in the IoT system together with at least one electronic apparatus.

Referring to FIG. 11, in the control method, a process including at least one clothing processing operation may be performed. In addition, during a period in which the process is being performed, information on the context of the electronic apparatus included in the IoT system may be received from the electronic apparatus at operation S1110.

The information on the context may include information on a remaining time until an end of a content that is being provided by the electronic apparatus, information on a position of the electronic apparatus, information on a remaining time until an end of a process that is being performed by the electronic apparatus, and the like, but it is not limited thereto.

In addition, in the control method, it may be identified whether a relationship between the remaining time until the end of the process that is being performed and the context of the electronic apparatus satisfies at least one predetermined condition, based on the received information at operation S1120.

In this case, when it is identified that the remaining time of the content that is being provided by the electronic apparatus is longer than the remaining time of the process that is being performed, by a threshold time or more, it may be identified that the predetermined condition is satisfied.

In addition, when it is identified that a position of the electronic apparatus becomes distant from a place where the clothing processing apparatus is positioned, by a threshold distance or more during a period in which the process is being performed, it may be identified that the predetermined condition is satisfied.

In addition, it may also be identified that the predetermined condition is satisfied, based on a relationship between a first remaining time of the process that is being performed by the electronic apparatus and a second remaining time of the process that is being performed by the clothing processing apparatus. In this case, the electronic apparatus may be another clothing processing apparatus.

As an example, when it is identified that the first remaining time of the process that is being performed by the electronic apparatus and the second remaining time of the process that is being performed by the clothing processing apparatus are different from each other and a difference between the first and second remaining times is less than a threshold time, it may be identified that the predetermined condition is satisfied.

As an example, when it is identified that a ratio of the first remaining time of the first process that is being performed by the electronic apparatus to a total time of the first process and a ratio of the second remaining time of the second process that is being performed by the clothing processing apparatus to a total time of the second process is a threshold ratio or more and the first remaining time and the second remaining time are different from each other, it may be identified that the predetermined condition is satisfied.

In addition, when it is identified that at least one predetermined condition is satisfied, the remaining process of the process that is being performed may be changed so that the remaining time of the process that is being performed is changed at operation S1130. In this case, a manner in which the remaining process is changed (whether the remaining time increases/decreases, a length of a time that increases/decreases, and the like) may be changed depending on the satisfied predetermined condition.

Specifically, when it is identified that the predetermined condition is satisfied, a performance time of at least one clothing processing operation included in the remaining process of the process that is being performed may be adjusted.

Alternatively, when it is identified that the predetermined condition is satisfied, at least one clothing processing operation may be added to the remaining process of the process that is being performed. In this case, at least one clothing processing operation included in the process that is being performed may be added to the remaining process of the process that is being performed or a new clothing processing operation that was not included in the process may be added to the remaining process of the process that is being performed.

The control method of a clothing processing apparatus described with reference to FIG. 11 may be performed by the clothing processing apparatus 100 illustrated in FIGS. 2 and 8 and described with reference to FIGS. 2 and 8.

Alternatively, the control method of a clothing processing apparatus described with reference to FIG. 11 may be performed by a system including the clothing processing apparatus 100 and at least one electronic apparatus.

Figure 12:
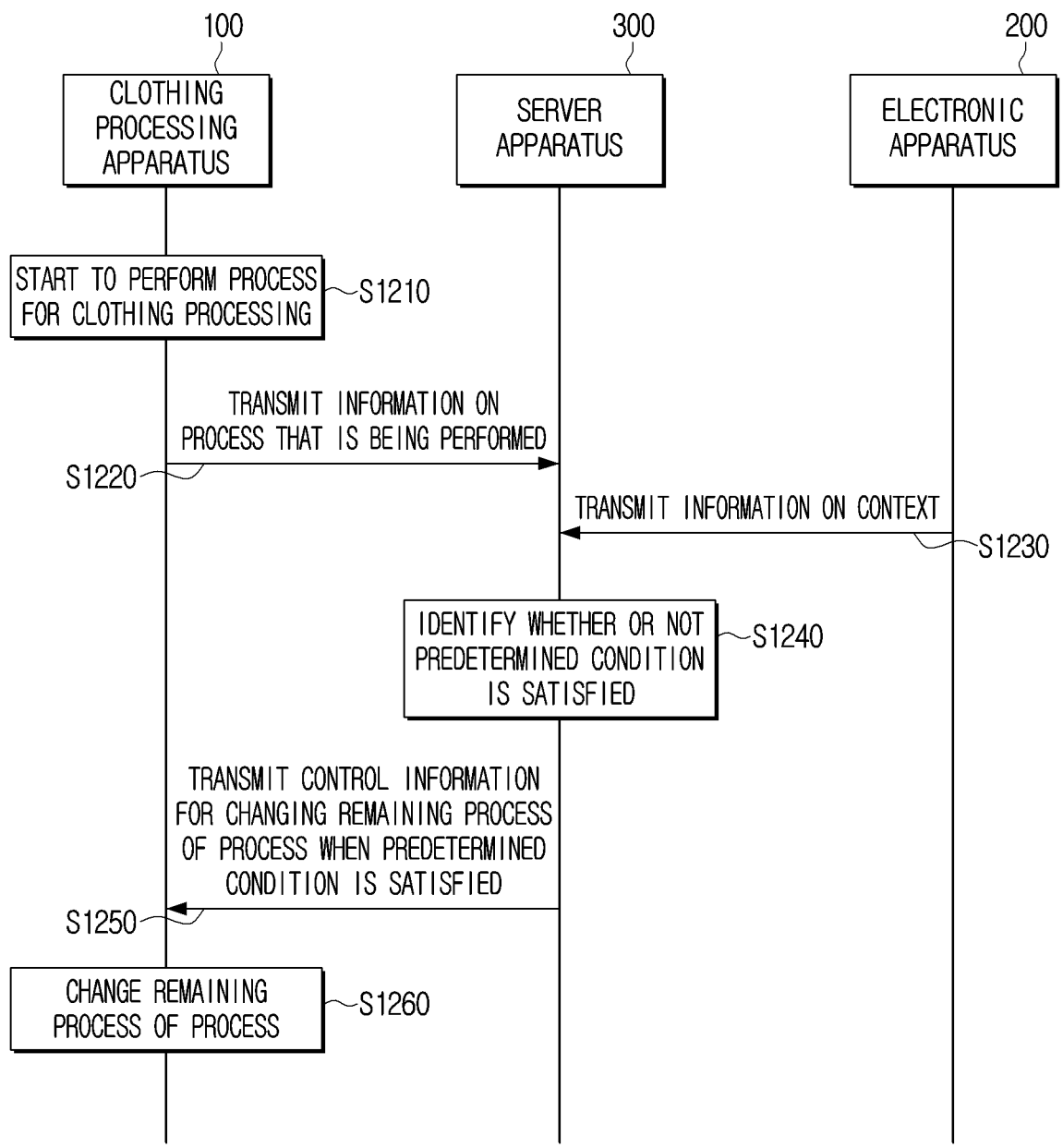
FIG. 12 is a sequence diagram for describing operations of a clothing processing apparatus, an electronic apparatus, and a server apparatus on an IoT system according to an embodiment of the disclosure.

FIG. 12 is a sequence diagram for describing operations of a clothing processing apparatus, an electronic apparatus, and a server apparatus on an IoT system according to an embodiment of the disclosure.

Referring to FIG. 12, the clothing processing apparatus 100 may perform a process for clothing processing at operation S1210. In addition, the clothing processing apparatus 100 may transmit information on a process that is being performed to the server apparatus 300 at operation S1220.

The server apparatus 300 may receive information on a context of the electronic apparatus 200 from the electronic apparatus 200 at operation S1230.

In addition, the server apparatus 300 may identify whether at least one predetermined condition is satisfied between the remaining time of the process that is being performed by the clothing processing apparatus 100 and the context of the electronic apparatus 200 at operation S1240.

When it is identified that the predetermined condition is satisfied, the server apparatus 300 may transmit control information for changing a remaining process of the process that is being performed to the clothing processing apparatus 100 at operation S1250.

As a result, the clothing processing apparatus 100 may change and perform the remaining process based on the received control information at operation S1260.

At least some of the operations described with reference to FIG. 12 may be slightly modified and practiced from usual technical common sense. For example, even though the operations S1220 and S1230 are performed in a changed order or are simultaneously performed, there is no problem.

The various embodiments described above may be implemented in a computer or a computer-readable recording medium using software, hardware, or a combination of software and hardware.

According to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, embodiments described in the specification may be implemented as the processor itself. According to a software implementation, embodiments such as procedures and functions described in the specification may be implemented as separate software modules. Each of the software modules described above may perform one or more functions and operations described in the specification.

Computer instructions for performing processing operations in the clothing processing apparatus 100 or the server apparatus 300 according to the various embodiments of the disclosure described above may be stored in a non-transitory computer-readable medium. The computer instructions stored in the non-transitory computer-readable medium cause a specific apparatus to perform the processing operations according to the various embodiments described above when they are executed by a processor of the specific apparatus.

The non-transitory computer-readable medium is not a medium that stores data for a while, such as a register, a cache, a memory, or the like, but means a medium that semi-permanently stores data and is readable by the apparatus. Specific examples of the non-transitory computer-readable medium may include a compact disc (CD), a digital versatile disc (DVD), a hard disk, a Blu-ray disc, a USB, a memory card, a ROM, and the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A clothing processing apparatus included in an Internet of Things (IoT) system, the clothing processing apparatus comprising:
a communication interface; and
a processor configured to perform a process including at least one clothing processing operation,
wherein the processor is configured to:
receive information on a context of an electronic apparatus included in the IoT system from the electronic apparatus through the communication interface during a period in which the process is being performed,
identify whether a relationship between a remaining time to an end of the process that is being performed and the context of the electronic apparatus satisfies a predetermined condition, based on the received information, and
change, based on the predetermined condition being identified as being satisfied, a remaining process of the process that is being performed so that the remaining time is changed, and
wherein the processor is further configured to identify that the predetermined condition is satisfied when it is identified that a remaining time of a content that is being provided by the electronic apparatus is longer than the remaining time of the process by a threshold time or more, based on the received information on the remaining time to an end of the content that is being provided by the electronic apparatus.

2. The clothing processing apparatus of claim 1,
wherein the information on the context of the electronic apparatus comprises information on a position of the electronic apparatus, and
wherein the processor is further configured to identify that the predetermined condition is satisfied when it is identified that the position of the electronic apparatus becomes distant from a place where the clothing processing apparatus is positioned, by a threshold distance or more during a period in which the process is performed, based on the received information.

3. The clothing processing apparatus of claim 1,
wherein the information on the context of the electronic apparatus comprises information on a remaining time to an end of a process that is being performed by the electronic apparatus, and
wherein the processor is further configured to identify that the predetermined condition is satisfied when it is identified that a first remaining time of the process that is being performed by the electronic apparatus and a second remaining time of the process that is being performed by the clothing processing apparatus are different from each other and a difference between the first remaining times and second remaining times is less than a threshold time, based on the received information.

4. The clothing processing apparatus of claim 1,
wherein the information on the context of the electronic apparatus comprises information on a remaining time to an end of a process that is being performed by the electronic apparatus, and
wherein the processor is further configured to identify that the predetermined condition is satisfied when it is identified that a ratio of a first remaining time of a first process that is being performed by the electronic apparatus to a total time of the first process and a ratio of a second remaining time of a second process that is being performed by the clothing processing apparatus to a total time of the second process is a threshold ratio or more and the first remaining time and the second remaining time are different from each other, based on the received information.

5. The clothing processing apparatus of claim 1, wherein the processor is further configured to adjust a performance time of the at least one clothing processing operation included in the remaining process of the process that is being performed, when it is identified that the predetermined condition is satisfied.

6. The clothing processing apparatus of claim 1, wherein the processor is further configured to add the at least one clothing processing operation to the remaining process of the process that is being performed, when it is identified that the predetermined condition is satisfied.

7. The clothing processing apparatus of claim 6, wherein the processor is further configured to add the at least one clothing processing operation included in the process to the remaining process of the process that is being performed or add a new clothing processing operation that was not included in the process to the remaining process of the process that is being performed.

8. A control method of a clothing processing apparatus included in an Internet of Things (IoT) system, the control method comprising:
   performing a process including at least one clothing processing operation;
   receiving information on a context of an electronic apparatus included in the IoT system from the electronic apparatus during a period in which the process is being performed;
   identifying whether a relationship between a remaining time to an end of the process that is being performed and the context of the electronic apparatus satisfies a predetermined condition, based on the received information; and
   changing, based on the predetermined condition being identified as being satisfied, a remaining process of the process that is being performed so that the remaining time is changed,
   wherein, in the identifying, it is identified that the predetermined condition is satisfied when it is identified that a remaining time of a content that is being provided by the electronic apparatus is longer than the remaining time of the process by a threshold time or more, based on the received information on the remaining time to an end of the content that is being provided by the electronic apparatus.

9. The control method of claim 8,
   wherein the information on the context of the electronic apparatus comprises information on a position of the electronic apparatus, and
   wherein, in the identifying, it is identified that the predetermined condition is satisfied when it is identified that the position of the electronic apparatus becomes distant from a place where the clothing processing apparatus is positioned, by a threshold distance or more during a period in which the process is performed, based on the received information.

10. The control method of claim 8,
    wherein the information on the context of the electronic apparatus comprises information on a remaining time to an end of a process that is being performed by the electronic apparatus, and
    wherein, in the identifying, it is identified that the predetermined condition is satisfied when it is identified that a first remaining time of the process that is being performed by the electronic apparatus and a second remaining time of the process that is being performed by the clothing processing apparatus are different from each other and a difference between the first remaining times and second remaining times is less than a threshold time, based on the received information.

11. The control method of claim 8,
    wherein the information on the context of the electronic apparatus comprises information on a remaining time to an end of a process that is being performed by the electronic apparatus, and
    wherein, in the identifying, it is identified that the predetermined condition is satisfied when it is identified that a ratio of a first remaining time of a first process that is being performed by the electronic apparatus to a total time of the first process and a ratio of a second remaining time of a second process that is being performed by the clothing processing apparatus to a total time of the second process is a threshold ratio or more and the first remaining time and the second remaining time are different from each other, based on the received information.

12. The control method of claim 8, wherein, in the changing, a performance time of the at least one clothing processing operation included in the remaining process of the process that is being performed is adjusted, when it is identified that the predetermined condition is satisfied.

13. The control method of claim 8, wherein, in the changing, the at least one clothing processing operation is added to the remaining process of the process that is being performed, when it is identified that the predetermined condition is satisfied.

14. The clothing processing apparatus of claim 1, wherein the context of the electronic apparatus includes information on a state or a situation of the electronic apparatus.

\* \* \* \* \*